(12) United States Patent
Nogami et al.

(10) Patent No.: US 8,477,934 B2
(45) Date of Patent: Jul. 2, 2013

(54) PAIRING COMPUTATION DEVICE, PAIRING COMPUTATION METHOD AND RECORDING MEDIUM STORING PAIRING COMPUTATION PROGRAM

(75) Inventors: Yasuyuki Nogami, Okayama (JP); Yumi Sakemi, Okayama (JP); Hiroaki Nasu, Okayama (JP); Yoshitaka Morikawa, Okayama (JP)

(73) Assignee: National University Corporation Okayama University, Okayama (JP)

( * ) Notice: Subject to any disclaimer, the term of this patent is extended or adjusted under 35 U.S.C. 154(b) by 0 days.

(21) Appl. No.: 13/264,897

(22) PCT Filed: Apr. 21, 2010

(86) PCT No.: PCT/JP2010/057534
§ 371 (c)(1),
(2), (4) Date: Oct. 17, 2011

(87) PCT Pub. No.: WO2010/123151
PCT Pub. Date: Oct. 28, 2010

(65) Prior Publication Data
US 2012/0045051 A1 Feb. 23, 2012

(30) Foreign Application Priority Data

Apr. 21, 2009 (JP) ................................. 2009-121398

(51) Int. Cl.
*H04K 1/00* (2006.01)

(52) U.S. Cl.
USPC .......................................................... 380/28

(58) Field of Classification Search
USPC .................... 380/28; 726/5; 708/277
See application file for complete search history.

(56) References Cited

U.S. PATENT DOCUMENTS

| 8,111,826 B2 * | 2/2012 | Takashima | ....................... 380/28 |
| 8,238,550 B2 * | 8/2012 | Akane et al. | ..................... 380/28 |

(Continued)

FOREIGN PATENT DOCUMENTS

| JP | 2005316267 | 11/2005 |
| WO | WO 2010/123151 | 10/2010 |

OTHER PUBLICATIONS

Information Security and Cryptology—ICISC 2009, Springer, 12th Int'l. Conference, Seoul, Korea, Dec. 2-4, 2009, Rev. Selected Papers, Lee, Donghoon; Hong, Seokhle, 1st Edition, 2010, XIII, 387 p., www.springer.com, 19 pages.

(Continued)

*Primary Examiner* — Samson Lemma
(74) *Attorney, Agent, or Firm* — Andrew F. Young, Esq.; Lackenbach Siegel, LLP

(57) ABSTRACT

There is provided a pairing computation device provided with a CPU which computes pairing e(S,Q) with S∈$G_1$, Q∈$G_2$, $\chi$ being a given integer variable, and F being a rational function calculated using Miller's algorithm with respect to multi-pairing (MMA). An order r, a trace t of the Frobenius endomorphism $\phi_p$ are specified preliminarily using the integer variable $\chi$ according to an embedding degree k. The CPU performs pairing computation by means of: an input unit which inputs the integer variable $\chi$, the rational point S, and the rational point Q into respective predetermined registers; a computation unit which computes F; a computation unit which computes a value at a rational point Q($x_Q$, $y_Q$) of a straight line passing through given rational points; a computation unit which computes $f'_{\chi,S}(Q)$ using the aforementioned F and the value; and a computation unit which computes the pairing e(S,Q) using aforementioned $f'_{\chi,S}(Q)$ as [F83].
[F83]

$$e(S,Q) = f'_{\chi,S}(Q)^{(p^k-1)/r}.$$

24 Claims, 8 Drawing Sheets

U.S. PATENT DOCUMENTS

| | | | |
|---|---|---|---|
| 2009/0083351 A1* | 3/2009 | Yonemura | 708/277 |
| 2009/0129600 A1* | 5/2009 | Brickell et al. | 380/282 |
| 2009/0285386 A1* | 11/2009 | Takashima | 380/28 |
| 2010/0260333 A1* | 10/2010 | Akane et al. | 380/28 |
| 2011/0179471 A1* | 7/2011 | Nogami et al. | 726/5 |

OTHER PUBLICATIONS

Pairing-Based Cryptography—Pairing 2008, Second Int'l. Conf., Egham, UK, Sep. 2008 Proceedings, Springer, Steven D. Galbraith, K.G. Paterson, (7 pgs.—Japanese, 14 pgs.—English).

Cryptology ePrint Archive, Report 2008/096, Optimal Pairings, F. Vercauteren, 15 pgs.

Integer Variable x-Based Ate Pairing, S.D. Galbraith and K.G. Paterson (Eds.); Pairing 2008, LNCS 5209, pp. 178-191, 2008, Springer-Verlag Berlin Heidelberg 2008, 15 pgs.

Efficient and Generalized Pairing Computation on Abelian Varieties, Lee, Lee and Park, JEEE Transactions on Information Theory, vol. 55, No. 4, Apr. 2009, pp. 1793-1803, 13 pgs.

IEEE Xplore Digital Library, An Improvement of Twisted Ate Pairing with Barreto-Naehrig Curve by Using, Sakemi, Y.; Kato, H; Grad Sch. Of Natural Sci. & Tech., Okayama Univ., Okayama, Copyrigh 2010 IEEE, pp. 406-410, 6 pgs.

* cited by examiner

PAIRING COMPUTATION DEVICE, PAIRING COMPUTATION METHOD AND RECORDING MEDIUM STORING PAIRING COMPUTATION PROGRAM

CROSS REFERENCE TO RELATED APPLICATIONS

This application claims priority from PCT/JP2010/057534 filed Apr. 21, 2010, the entire contents of which are incorporated herein by reference, and which in turn claims priority from JP Ser. No. 2009-121398 filed Apr. 21, 2009.

FIELD OF THE INVENTION

The present invention relates to a pairing computation device and a pairing computation method which enable to perform pairing computation at high speed, and a recording medium storing a pairing computation program.

DESCRIPTION OF THE RELATED ART

Conventionally, when an individual user uses various kinds of services provided on a network such as the Internet, there are some cases where authentication procedure using ID and password set preliminarily for each individual user is requested. The authentication procedure like this is for confirming, in general, that an individual user is a normal user and the authentication processing for the authentication procedure is performed by an authentication server.

Recently, with the use of digital signature technology, user-specific digital signature data is added to each individual data per se to make it possible to assure that data used by an individual user is not falsified by a third party or is not leaked to a third party. Accordingly, even high confidential information has been safely handled on a network.

On the other hand, in the digital signature, since an individual user is identified along with authentication processing by an authentication server, each time the authentication processing is performed, a history of each individual user is sequentially accumulated as information on the authentication server. Therefore, since personal information such as what kind of sites did a user get access to, or what kind of services did a user use is accumulated on the authentication server, adequate attention is paid so that any such information should not be leaked from the point of view of personal information protection.

In order to resolve the accumulation of history information about an individual user which arises from employing this digital signature, there has been proposed to employ digital group signature which is extended from the digital signature.

In a case where the digital group signature is employed, an individual user transmits anonymously signature data which certifies only that the individual user belongs to a certain group to an authentication server, and the authentication server authenticates that the individual user belongs to a certain group without identifying individual user from the received signature data. Therefore, the authentication server blocks unfair use by individual user who does not belong to the group on one hand, and authenticates individual user without accumulating history information about each individual user on the other hand.

In the anonymous authentication in the digital group signature, paring computation is employed.

Paring computation is a computation using a function of two inputs and one output. For example, letting S be a rational point over a prime field $F_p$, Q be a rational point over a k-th extension field $F_p^k$, by inputting two rational points S and Q, an element z over an extension field $F^*_p{}^k$ is outputted. And yet, authentication is performed by using a property of bilinearity that when a times of rational point S and b times of rational point Q are inputted, z to the power of ab is outputted. Here, "k" is called an embedding degree, and "$F^*_p{}^k$" is meant to be correctly displayed in mathematical notation as [F31]

$$F^*_p{}^k$$

However, due to display restrictions, it is denoted as $F^*_p{}^k$.

Generally, for rational points S and Q, points on an elliptic curve are used respectively. The pairing computation of points on an elliptic curve is constituted of a step which computes using Miller's algorithm and a step which performs an exponentiation with respect to a result of the computation.

In the digital group signature, when performing authentication processing of access right of an individual user who belongs to a group, after having performed pairing computation to exclude individual users who have lost access rights, authentication processing is performed by performing pairing computation of the given individual user and hence, it has been possible to respond flexibly to attributes changes due to issuance and expiration of access right for each individual user.

Therefore, in a case of digital group signature where a group is constituted of, for example, 10,000 individual users, if there are 100 individual users who have lost their access rights, it is necessary to perform 100 pairing computations. Since there needs about 0.1 second per one pairing computation performed by present general electronic computer, 100 pairing computations require about 10 seconds. Accordingly, in practical use, the number of individual users is limited and hence, the digital group signature has not been widely used.

Accordingly, in order to enhance usefulness of the digital group signature by increasing computation speed of the pairing computation, there have been proposed techniques which try to realize high-speed computation by, for example, employing Tate pairing computation method which is defined on an elliptic curve as pairing computation to reduce computation load (For example, see JP 2005-316267A.).

SUMMARY OF THE INVENTION

However, speeding up of pairing computation currently proposed is not yet sufficient and further speeding up of the paring computation has been sought.

The inventors, in view of the present situation, have done research and development to speed up pairing computation and have made the present invention.

According to an aspect of the present invention, there is provided a pairing computation device, in which, as described in claim 1, an elliptic curve is given as $y^2 = x^3 + ax + b$, $a \in F_p$, $b \in F_p$, letting k be an embedding degree, E be an additive group constituted of rational points on the pairing enabled elliptic curve defined over an extension field $F_p^k$, E[r] be a set of rational points having a prime order r, and $\phi_p$ be a Frobenius endomorphism, a pairing e is defined using $$G_1 = E[r] \cap \mathrm{Ker}(\phi_p - [1]),$$

$$G_2 = E[r] \cap \mathrm{Ker}(\phi_p - [p]),$$

as a non-degenerate bilinear map $$e: G_1 \times G_2 \to F^*_p{}^k / (F^*_p{}^k)^r, \text{ and}$$

the pairing computation device comprises a CPU which computes the pairing e(S, Q), by letting $S \in G_1$, $Q \in G_2$, $\chi$ be a given integer variable, and F be a rational function which is calculated using Miller's algorithm with respect to multi-pairing (MMA), the order r and a trace t of the Frobenius endomorphism $\phi_p$ are specified preliminarily according to the embedding degree k using the integer variable $\chi$, and the CPU includes:

an input unit which inputs the integer variable $\chi$, the rational point S, and the rational point Q into respective predetermined registers;

a computation unit which computes F;

a computation unit which computes a value of a straight line passing through given rational points at a rational point $Q(x_Q, y_Q)$;

a computation unit which computes $f'_{\chi,S}(Q)$ using said F and said value; and a computation unit which computes the pairing e(S, Q) using said $f'_{\chi,S}(Q)$ as

[F32]

$$e(S, Q) = f'_{\chi,S}(Q)^{(p^k-1)/r}.$$

According to a further aspect of the present invention, there is provided a pairing computation method, in which, as described in claim 2, an elliptic curve is given as $y^2=x^3+ax+b$, $a \epsilon F_p$, $b \epsilon F_p$, letting k be an embedding degree, E be an additive group constituted of rational points on the pairing enabled elliptic curve defined over an extension field $F_p^k$, E[r] be a set of rational points having a prime order r, and $\phi_p$ be a Frobenius endomorphism, a pairing e is defined using $$G_1 = E[r] \cap \mathrm{Ker}(\phi_p - [1]),$$

$$G_2 = E[r] \cap \mathrm{Ker}(\phi_p - [p]),$$

as non-degenerate bilinear map $$e: G_1 \times G_2 \to F_p^{*k}/(F_p^{*k})^r,$$

an electronic computer which includes a CPU computes the pairing e(S, Q), by letting $S \in G_1$, $Q \in G_2$, $\chi$ be a given integer variable, and F be a rational function which is calculated using Miller's algorithm with respect to multi-pairing (MMA), the order r and a trace t of the Frobenius endomorphism $\phi_p$ are specified preliminarily according to the embedding degree k using the integer variable $\chi$, and the pairing computation method comprises:

a step of inputting the integer variable $\chi$, the rational point S, and the rational point Q into respective predetermined registers by causing the CPU of the electronic computer to function as an input unit;

a step of computing F by causing the CPU of the electronic computer to function as a computation unit;

a step of computing a value of a straight line passing through given rational points at a rational point $Q(x_Q, y_Q)$ by causing the CPU of the electronic computer to function as a computation unit;

a step of computing $f'_{\chi,S}(Q)$ using said F and said value by causing the CPU of the electronic computer to function as a computation unit; and a step of computing the pairing e(S, Q) using said $f'_{\chi,S}(Q)$ as

[F33]

$$e(S, Q) = f'_{102,S}(Q)^{(p^k-1)/r}$$

by causing the CPU of the electronic computer to function as a computation unit.

According to a further aspect of the present invention, there is provided a pairing computation program stored in a recording medium, in which, as described in claim 3, an elliptic curve is given as $y^2=x^3+ax+b$, $a \epsilon F_p$, $b \epsilon F_p$, letting k be an embedding degree, E be an additive group constituted of rational points on the pairing enabled elliptic curve defined over an extension field $F_p^k$, E[r] be a set of rational points having a prime order r, and $\phi_p$ be a Frobenius endomorphism, a pairing e is defined using $$G_1 = E[r] \cap \mathrm{Ker}(\phi_p - [1]),$$

$$G_2 = E[r] \cap \mathrm{Ker}(\phi_p - [p]),$$

as non-degenerate bilinear map $$e: G_1 \times G_2 \to F_p^{*k}/(F_p^{*k})^r, \text{ and}$$

the pairing computation program causes an electronic computer which includes a CPU to compute the pairing e(S, Q), by letting $S \in G_1$, $Q \in G_2$, $\chi$ be a given integer variable, and F be a rational function which is calculated using Miller's algorithm with respect to multi-pairing (MMA), the order r and a trace t of the Frobenius endomorphism $\phi_p$ are specified preliminarily according to the embedding degree k using the integer variable $\chi$, and the pairing computation program causes the CPU of the electronic computer to function as:

an input unit which inputs the integer variable $\chi$, the rational point S, and the rational point Q into respective predetermined registers;

a computation unit which computes F;

a computation unit which computes a value of a straight line passing through given rational points at a rational point $Q(x_Q, y_Q)$;

a computation unit which computes $f'_{\chi,S}(Q)$ using said F and said value;

and a computation unit which computes the pairing e(S, Q) using said $f'_{\chi,S}(Q)$ as

[F34]

$$e(S, Q) = f'_{\chi,S}(Q)^{(p^k-1)/r}.$$

According to a further aspect of the present invention, there is provided a pairing computation device, in which, as described in claim 4, an elliptic curve is given as $y^2=x^3+b$, $b \epsilon F_p$, letting an embedding degree be 12, E be an additive group constituted of rational points on the pairing enabled elliptic curve defined over an extension field $F_p^{12}$, E[r] be a set of rational points having a prime order r, and $\phi_p$ be a Frobenius endomorphism, a pairing e is defined using $$G_1 = E[r] \cap \mathrm{Ker}(\phi_p - [1]),$$

$$G_2 = E[r] \cap \mathrm{Ker}(\phi_p - [p]),$$

as a non-degenerate bilinear map $$e: G_1 \times G_2 \to F_p^{*12}/(F_p^{*12})^r, \text{ and}$$

the pairing computation device comprises a CPU which computes the pairing e(S, Q), by letting $S \in G_1$, $Q \in G_2$, $\chi$ be a given integer variable, $Z_S$ be a set of rational points S and pS, $Z_Q$ be a set of rational points pQ and Q, and $F_{2\chi, ZS}(Z_Q)$ be a rational function which is calculated using Miller's algorithm with respect to multi-pairing (MMA), the order r and a trace t of the Frobenius endomorphism $\phi_p$ are specified using the integer variable $\chi$ as, $$r(\chi) = 36\chi^4 - 36\chi^3 + 18\chi^2 - 6\chi + 1,$$

$$t(\chi) = 6\chi^2 + 1,$$

and a representation of the integer variable $\chi$ using $p^{10}$ with p as a characteristic is $$p \equiv (2\chi - 1)p^{10} + 2\chi(\mathrm{mod}\, r(\chi)), \text{ and}$$

the CPU includes:

an input unit which inputs the integer variable $\chi$, the rational point S, and the rational point Q into respective predetermined registers;

a first computation unit which computes $F_{2\chi,ZS}(Z_Q)$;

a second computation unit which computes given rational points using $2\chi S$ and $2\chi pS$ which are calculated when computing said $F_{2\chi,ZS}(Z_Q)$;

a third computation unit which computes a value at a rational point $Q(x_Q, y_Q)$ of a straight line passing through the given rational points;

a fourth computation unit which computes $f'_{\chi,S}(Q)$ using said $F_{2\chi,ZS}(Z_Q)$ and said value; and a fifth computation unit which computes the pairing $e(S, Q)$ using said $f'_{\chi,S}(Q)$ as

[F35]

$$e(S, Q) = f'_{\chi,S}(Q)^{(p^{12}-1)/r}.$$

In particular, the pairing computation device is characterized in that the second computation unit computes respective rational points $-S$, $(2\chi-1)S$, $p^{10}((2\chi-1)S)$, $-pS$, $(2\chi-1)pS$, $p^{10}(2\chi-1)pS$ in order using previously obtained results, the third computation unit respectively computes a value $l_1$ at a rational point $Q(x_Q, y_Q)$ of a straight line passing through rational points $((2\chi-1)S, -S)$, a value $l_2$ at the rational point $Q(x_Q, y_Q)$ of a straight line passing through rational points $((2\chi-1)pS, -pS)$, a value $l_3$ at the rational point $Q(x_Q, y_Q)$ of a straight line passing through rational points $(p^{10}((2\chi-1)S), 2\chi S)$, and a value $l_4$ at the rational point $Q(x_Q, y_Q)$ of a straight line passing through rational points $(p^{10}((2\chi-1)pS), 2\chi pS)$, and the fourth computation unit computes $f'_{\chi,S}(Q)$ as

[F36]

$$f'_{\chi,S}(Q) = \{F_{2\chi,ZS}(Z_Q) \cdot \{l_1^p \cdot l_2\}^{-1}\}^{p_{10}} \cdot F_{2\chi,ZS}(Z_Q) \cdot l_3^p \cdot l_4.$$

According to a further aspect of the present invention, there is provided a pairing computation method, in which, as described in claim 6, an elliptic curve is given as $y^2 = x^3 + b$, $b \in F_p$, letting an embedding degree be 12, E be an additive group constituted of rational points on the pairing enabled elliptic curve defined over an extension field $F_p^{12}$, $E[r]$ be a set of rational points having a prime order r, and $\phi_p$ be a Frobenius endomorphism, a pairing e is defined using $$G_1 = E[r] \cap \mathrm{Ker}(\phi_p - [1]),$$

$$G_2 = E[r] \cap \mathrm{Ker}(\phi_p - [p]),$$

as a non-degenerate bilinear map $$e: G_1 \times G_2 \rightarrow F^*_p{}^{12}/(F_p^{12})^r,$$

an electronic computer which includes a CPU computes the pairing $e(S, Q)$, by letting $S \in G_1$, $Q \in G_2$, $\chi$ be a given integer variable, $Z_S$ be a set of rational points S and pS, $Z_Q$ be a set of rational points pQ and Q, and $F_{2\chi,ZS}(Z_Q)$ be a rational function which is calculated using Miller's algorithm with respect to multi-pairing (MMA), the order r and a trace t of the Frobenius endomorphism $\phi_p$ are specified using the integer variable $\chi$ as, $$r(\chi) = 36\chi^4 - 36\chi^3 + 18\chi^2 - 6\chi + 1$$

$$t(\chi) = 6\chi^2 + 1,$$

and a representation of the integer variable $\chi$ using $p^{10}$ with p as a characteristic is $$p \equiv (2\chi - 1)p^{10} + 2\chi (\mathrm{mod}\, r(\chi)), \text{ and}$$

the pairing computation method comprises:

an input step which inputs the integer variable $\chi$, the rational point S, and the rational point Q into respective predetermined registers by causing the CPU of the electronic computer to function as an input unit;

a first computation step which computes $F_{2\chi,ZS}(Z_Q)$ by causing the CPU of the electronic computer to function as a first computation unit;

a second computation step which computes given rational points using $2\chi S$ and $2\chi pS$ which are calculated when computing said $F_{2\chi,ZS}(Z_Q)$ by causing the CPU of the electronic computer to function as a second computation unit;

a third computation step which computes a value at a rational point $Q(x_Q, y_Q)$ of a straight line passing through the given rational points by causing the CPU of the electronic computer to function as a third computation unit;

a fourth computation step which computes $f'_{\chi,S}(Q)$ using said $F_{2\chi,ZS}(Z_Q)$ and said value by causing the CPU of the electronic computer to function as a fourth computation unit; and a fifth computation step which computes the pairing $e(S, Q)$ using said $f'_{\chi,S}(Q)$ as

[F37]

$$e(S, Q) = f'_{\chi,S}(Q)^{(p^{12}-1)/r},$$

by causing the CPU of the electronic computer to function as a fifth computation unit.

In particular, the pairing computation method is characterized in that the second computation step computes respective rational points $-S$, $(2\chi-1)S$, $p^{10}((2\chi-1)S)$, $-pS$, $(2\chi-1)pS$, $p^{10}((2\chi-1)pS)$ in order using previously obtained results, the third computation step respectively computes a value $l_1$ at a rational point $Q(x_Q, y_Q)$ of a straight line passing through rational points $((2\chi-1)S, -S)$, a value $l_2$ at the rational point $Q(x_Q, y_Q)$ of a straight line passing through rational points $((2\chi-1)pS, -pS)$, a value $l_3$ at the rational point $Q(x_Q, y_Q)$ of a straight line passing through rational points $(p^{10}((2\chi-1)S), 2\chi S)$, and a value $l_4$ at the rational point $Q(x_Q, y_Q)$ of a straight line passing through rational points $(p^{10}((2\chi-1)pS), 2\chi pS)$, and the fourth computation step computes $f'_{\chi,S}(Q)$ as

[F38]

$$F'_{\chi,S}(Q) = \{F_{2\chi,Z^S}(Z_Q) \cdot \{l_1^p \cdot l_2\}^{-1}\}^{p^{10}} \cdot F_{2\chi,Z^S}(Z_Q) \cdot l_3^p \cdot l_4.$$

According to a further aspect of the present invention, there is provided a pairing computation program, in which, as described in claim 8, an elliptic curve is given as $y^2 = x^3 + b$, $b \in F_p$, letting an embedding degree be 12, E be an additive group constituted of rational points on the pairing enabled elliptic curve defined over an extension field $F_p^{12}$, $E[r]$ be a set of rational points having a prime order r, and $\phi_p$ be a Frobenius endomorphism, a pairing e is defined using $$G_1 = E[r] \cap \mathrm{Ker}(\phi_p - [1]),$$

$$G_2 = E[r] \cap \mathrm{Ker}(\phi_p - [p]),$$

as a non-degenerate bilinear map $$e: G_1 \times G_2 \rightarrow F^*_p{}^{12}/(F^*_p{}^{12})^r,$$

the pairing computation program causes an electronic computer which includes a CPU to compute the pairing $e(S, Q)$, by letting $S \in G_1$, $Q \in G_2$, $\chi$ be a given integer variable, $Z_S$ be a set of rational points S and pS, $Z_Q$ be a set of rational points pQ and Q, and $F_{2\chi,ZS}(Z_Q)$ be a rational function which is calculated using Miller's algorithm with respect to multi-pairing (MMA), the order r and a trace t of the Frobenius endomorphism $\phi_p$ are specified using the integer variable $\chi$ as, $$r(\chi)=36\chi^4-36\chi^3+18\chi^2-6\chi+1,$$

$$t(\chi)=6\chi^2+1,$$

and a representation of the integer variable $\chi$ using $p^{10}$ with p as a characteristic is $$p \equiv (2\chi-1)p^{10}+2\chi (\mathrm{mod}\, r(\chi)),$$

the pairing computation program causes the CPU of the electronic computer to function as:

an input unit which inputs the integer variable $\chi$, the rational point S, and the rational point Q into respective predetermined registers;

a first computation unit which computes $F_{2\chi,ZS}(Z_Q)$;

a second computation unit which computes given rational points using $2\chi S$ and $2\chi pS$ which are calculated when computing said $F_{2\chi,ZS}(Z_Q)$;

a third computation unit which computes a value at a rational point $Q(x_Q, y_Q)$ of a straight line passing through the given rational points;

a fourth computation unit which computes $f'_{\chi,S}(Q)$ using said $F_{2\chi,ZS}(Z_Q)$ and said value; and a fifth computation unit which computes the pairing $e(S,Q)$ using said $f'_{\chi,S}(Q)$ as

[F39]

$$e(S,Q)=f'_{\chi,S}(Q)^{(p^{12}-1)/r}.$$

In particular, the pairing computation program is characterized in that the pairing computation program causes:

the CPU of the electronic computer which functions as the second computation unit to compute respective rational points $-S$, $(2\chi-1)S$, $p^{10}((2\chi-1)S)$, $-pS$, $(2\chi-1)pS$, $p^{10}((2\chi-1)_{PS})$ in order using previously obtained results;

the CPU of the electronic computer which functions as the third computation unit to compute respectively a value $l_1$ at a rational point $Q(x_Q, y_Q)$ of a straight line passing through rational points $((2\chi-1)S, -S)$, a value $l_2$ at the rational point $Q(x_Q, y_Q)$ of a straight line passing through rational points $((2\chi-1)pS, -pS)$, a value $l_3$ at the rational point $Q(x_Q, y_Q)$ of a straight line passing through rational points $(p^{10}((2\chi-1)S), 2\chi S)$, and a value $l_4$ at the rational point $Q(x_Q, y_Q)$ of a straight line passing through rational points $(p^{10}((2\chi-1)pS, 2\chi pS)$; and the CPU of the electronic computer which functions as the fourth computation unit to compute $f'_{\chi,S}(Q)$ as

[F40]

$$f'_{\chi,S}(Q)=\{F_{2\chi,ZS}(Z_Q) \cdot \{l_1^p \cdot l_2\}^{-1}\}^{p^{10}} \cdot F_{2\chi,ZS}(Z_Q) \cdot l_3^p \cdot l_4.$$

According to a further aspect of the present invention, there is provided a pairing computation device, in which, as described in claim 10, an elliptic curve is given as $y^2=x^3+ax$, $a \in F_p$, letting an embedding degree be 8, E be an additive group constituted of rational points on the pairing enabled elliptic curve defined over an extension field $F_p^8$, $E[r]$ be a set of rational points having a prime order r, and $\phi_p$ be a Frobenius endomorphism, a pairing e is defined using $$G_1=E[r] \cap \mathrm{Ker}(\phi_p-[1]),$$

$$G_2=E[r] \cap \mathrm{Ker}(\phi_p-[p]),$$

as a non-degenerate bilinear map $$e:G_1 \times G_2 \to F^*_{p^8}/(F^*_{p^8})^r,$$

the pairing computation device comprising a CPU which computes the pairing $e(S,Q)$, by letting $S \in G$, $Q \in G_2$, $\chi$ be a given integer variable, $Z_S$ be a set of rational points S and $p^3S$, $Z_Q$ be a set of rational points $p^3Q$ and Q, and $F_{3\chi,ZS}(Z_Q)$ be a rational function which is calculated using Miller's algorithm with respect to multi-pairing (MMA), the order r and a trace t of the Frobenius endomorphism $\phi_p$ are specified using the integer variable $\chi$ as, $$r(\chi)=9\chi^4+12\chi^3+8\chi^2+4\chi+1,$$

$$t(\chi)=-9\chi^3-3\chi^2-2\chi,$$

and a representation of the integer variable $\chi$ using $p^2$ and $p^3$ with p as a characteristic is $$p^3 \equiv p^2+3\chi+1 (\mathrm{mod}\, r(\chi)) \text{ and}$$

the CPU includes:

an input unit which inputs the integer variable $\chi$, the rational point S, and the rational point Q into respective predetermined registers;

a first computation unit which computes $F_{3\chi,ZS}(Z_Q)$ a second computation unit which computes respective rational points $p^2(S)$, $p^2(p^3S)$, $(3\chi+1)S$, $(3\chi+1)p^2S$ in order using previously obtained results;

a third computation unit which respectively computes a value $l_5$ at a rational point $Q(x_Q, y_Q)$ of a straight line passing through rational points $(3\chi S, S)$, a value $l_6$ at the rational point $Q(x_Q, y_Q)$ of a straight line passing through rational points $(p^2(S), (3\chi+1)S)$, a value $l_7$ at the rational point $Q(x_Q, y_Q)$ of a straight line passing through rational points $(3\chi p^3S, p^2S)$, and a value $l_8$ at the rational point $Q(x_Q, y_Q)$ of a straight line passing through rational points $(p^2(p_3S), (3\chi+1)p^3S)$;

the fourth computation unit which computes $f'_{\chi,S}(Q)$ using a computation result of the first computation unit and a computation result of the third computation unit as

[F41]

$$f'_{\chi,S}(Q)=F_{3\chi,Z_Z}(Z_Q)\{l_5 \cdot l_6\}^{p^5} \cdot l_7 \cdot l_8; \text{ and}$$

a fifth computation unit which computes the pairing $e(S,Q)$ using said $f'_{\chi,S}(Q)$ as

[F42]

$$e(S,Q)=f'_{\chi,S}(Q)^{(p^8-1)/r}.$$

According to a further aspect of the present invention, there is provided a pairing computation method, in which, as described in claim 11, an elliptic curve is given as $y^2=x^3+ax$, $a \in F_p$, letting an embedding degree be 8, E be an additive group constituted of rational points on the pairing enabled elliptic curve defined over an extension field $F_p^8$, $E[r]$ be a set of rational points having a prime order r, and $\phi_p$ be a Frobenius endomorphism, a pairing e is defined using $$G_1=E[r] \cap \mathrm{Ker}(\phi_p-[1]),$$

$$G_2=E[r] \cap \mathrm{Ker}(\phi_p-[p]),$$

as a non-degenerate bilinear map $$e:G_1 \times G_2 \to F^*_{p^8}/(F^*_{p^8})^r,$$

an electronic computer which includes a CPU computes the pairing $e(S,Q)$, by letting $S \in G_1$, $Q \in G_2$, $\chi$ be a given integer variable, $Z_S$ be a set of rational points S and $p^3S$, $Z_Q$ be a set of rational points $p^3Q$ and Q, and $F_{3\chi,ZS}(Z_Q)$ be a rational function which is calculated using Miller's algorithm with respect to multi-pairing (MMA), the order r and a trace t of the Frobenius endomorphism $\phi_p$ are specified using the integer variable $\chi$ as, $$r(\chi)=9\chi^4+12\chi^3+8\chi^2+4\chi+1,$$

$$t(\chi)=-9\chi^3-3\chi^2-2\chi,$$

and a representation of the integer variable $\chi$ using $p^2$ and $p^3$ with p as a characteristic is $$p^3 \equiv p^2 + 3\chi + 1 \pmod{r(\chi)}$$

the pairing computation method comprises:
an input step which inputs the integer variable $\chi$, the rational point S, and the rational point Q into respective predetermined registers by causing the CPU of the electronic computer to function as an input unit;
a first computation step which computes $F_{3\chi,ZS}(Z_Q)$ by causing the CPU of the electronic computer to function as a first computation unit;
a second computation step which computes respective rational points $p^2(S)$, $p^2(p^3S)$, $(3\chi+1)S$, $(3\chi+1)p^3S$ in order using previously obtained results by causing the CPU of the electronic computer to function as a second computation unit;
a third computation step which respectively computes a value $l_5$ at a rational point $Q(x_Q, y_Q)$ of a straight line passing through rational points $(3\chi S, S)$, a value $l_6$ at the rational point $Q(x_Q, y_Q)$ of a straight line passing through rational points $(p^2(S), (3\chi+1)S)$, a value $l_7$ at the rational point $Q(x_Q, y_Q)$ of a straight line passing through rational points $(3\chi p^3S, p^3S)$, and a value $l_8$ at the rational point $Q(x_Q, y_Q)$ of a straight line passing through rational points $(p^2(p^3S), (3\chi+1)p^3S)$ by causing the CPU of the electronic computer to function as a third computation unit;
a fourth computation step which computes $f'_{\chi,S}(Q)$ using said $F_{3\chi,ZS}(Z_Q)$ and said values $_5, l_6, l_7, l_8$ as
[F43]

$$f'_{\chi,S}(Q) = F_{3\chi,ZS}(Z_Q)\{l_5 \cdot l_6\}^{p^8} \cdot l_7 \cdot l_8$$

by causing the CPU of the electronic computer to function as a fourth computation unit; and
a fifth computation step which computes the pairing e(S, Q) using said $f'_{\chi,S}(Q)$ as
[F44]

$$e(S, Q) = f'_{\chi,S}(Q)^{(p^8-1)/r}$$

by causing the CPU of the electronic computer to function as a fifth computation unit.
According to a further aspect of the present invention, there is provided a pairing computation program, in which, as described in claim 12,
an elliptic curve is given as $y^2 = x^3 + ax$, $a \in F_p$, letting an embedding degree be 8, E be an additive group constituted of rational points on the pairing enabled elliptic curve defined over an extension field $F_p^8$, E[r] be a set of rational points having a prime order r, and $\phi_p$ be a Frobenius endomorphism, a pairing e is defined using $$G_1 = E[r] \cap \text{Ker}(\phi_p - [1]),$$

$$G_2 = E[r] \cap \text{Ker}(\phi_p - [p]),$$

as a non-degenerate bilinear map $$e: G_1 \times G_2 \to F^*_{p^8}/(F^*_{p^8})^r,$$

the pairing computation program causes an electronic computer which includes a CPU to compute the pairing e(S, Q), by letting $S \in G_1$, $Q \in G_2$, $\chi$ be a given integer variable, $Z_S$ be a set of rational points S and $p^3S$, $Z_Q$ be a set of rational points $p^3Q$ and Q, and $F_{3\chi,ZS}(Z_Q)$ be a rational function which is calculated using Miller's algorithm with respect to multi-pairing (MMA),
the order r and a trace t of the Frobenius endomorphism $\phi_p$ are specified using the integer variable $\chi$ as, $$r(\chi) = 9\chi^4 + 12\chi^3 + 8\chi^2 + 4\chi + 1,$$

$$t(\chi) = -9\chi^3 - 3\chi^2 - 2\chi,$$

and a representation of the integer variable $\chi$ using $p^2$ and $p^3$ with p as a characteristic is $$p^3 \equiv p^2 + 3\chi + 1 \pmod{r(\chi)}$$

the pairing computation program causes the CPU of the electronic computer to function as:
an input unit which inputs the integer variable $\chi$, the rational point S, and the rational point Q into respective predetermined registers;
a first computation unit which computes $F_{3\chi, ZS}(Z_Q)$;
a second computation unit which computes respective rational points $p^2(S)$, $p^2(p^3S)$, $(3\chi+1)S$, $(3\chi+1)p^3S$ in order using previously obtained results;
a third computation unit which respectively computes a value $l_5$ at a rational point $Q(x_Q, y_Q)$ of a straight line passing through rational points $(3\chi S, S)$, a value $l_6$ at the rational point $Q(x_Q, y_Q)$ of a straight line passing through rational points $(p^2(S), (3\chi+1)S)$, a value $l_7$ at the rational point $Q(x_Q, y_Q)$ of a straight line passing through rational points $(3\chi p^3S, p^3S)$, and a value $l_8$ at the rational point $Q(x_Q, y_Q)$ of a straight line passing through rational points $(p^2(p^3S), (3\chi+1)p^3S)$;
a fourth computation unit which computes $f'_{\chi,S}(Q)$ using said $F_{3\chi,ZS}(Z_Q)$ and said values $l_5, l_5, l_7, l_8$ as
[F45]

$$f'_{\chi,S}(Q) = F_{3\chi,ZS}(Z_Q)\{l_5 \cdot l_6\}^{p^5} \cdot l_7 \cdot l_8; \text{ and}$$

a fifth computation unit which computes the pairing e(S, Q) using said $f'_{\chi,S}(Q)$ as
[F46]

$$e(S, Q) = f'_{\chi,S}(Q)^{(p^8-1)/r}.$$

According to a further aspect of the present invention, there is provided a pairing computation device, in which, as described in claim 13,
an elliptic curve is given as $y^2 = x^3 + ax + b$, $a \in F_p$, $b \in F_p$, letting k be an embedding degree, E be an additive group constituted of rational points on the pairing enabled elliptic curve defined over an extension field $F_p^k$, E[r] be a set of rational points having a prime order r, and $\phi_p$ be a Frobenius endomorphism, a pairing e is defined using $$G_1 = E[r] \cap \text{Ker}(\phi_p - [1]),$$

$$G_2 = E[r] \cap \text{Ker}(^{SM}_p - [p]),$$

as a non-degenerate bilinear map $$e: G_1 \times G_2 \to F^*_{p^k}/(F^*_{p^k})^r,$$

the pairing computation device comprises a CPU which computes the pairing e(S, Q), by letting $S \in G_1$, $Q \in G_2$, $\chi$ be a given integer variable, and f be a rational function which is calculated using Miller's algorithm,
the order r and a trace t of the Frobenius endomorphism $\phi_p$ are specified preliminarily according to the embedding degree k using the integer variable $\chi$, and
the CPU includes:
an input unit which inputs the integer variable $\chi$, the rational point S, and the rational point Q into respective predetermined registers;
a computation unit which computes f;
a computation unit which computes a value of a straight line passing through given rational points at a rational point $Q(x_Q, y_Q)$;
a computation unit which computes $f'_{\chi,S}(Q)$ using said f and said value; and a computation unit which computes the pairing e (S, Q) using said f'$_{\chi,S}$(Q) as
[F47]

$$e(S, Q) = f'_{\chi,S}(Q)^{(p^k-1)/r}.$$

According to a further aspect of the present invention, there is provided a pairing computation method, in which, as described in claim 14, an elliptic curve is given as $y^2 = x4ax+b$, $a \in F_p$, $b \in F_p$, letting k be an embedding degree, E be an additive group constituted of rational points on the pairing enabled elliptic curve defined over an extension field $F_p^k$, E[r] be a set of rational points having a prime order r, and $\phi_p$ be a Frobenius endomorphism, a pairing e is defined using $$G_1 = E[r] \cap \mathrm{Ker}(\phi_p - [1]),$$

$$G_2 = E[r] \cap \mathrm{Ker}(\phi_p - [p]),$$

as non-degenerate bilinear map $$e: G_1 \times G_2 \to F_p^{*k}/(F_p^{*k})^r,$$

an electronic computer which includes a CPU computes the pairing e (S, Q), by letting $S \in G_1$, $Q \in G_2$, $\chi$ be a given integer variable, and f be a rational function which is calculated using Miller's algorithm, the order r and a trace t of the Frobenius endomorphism $\phi_p$ are specified preliminarily according to the embedding degree k using the integer variable $\chi$, and the pairing computation method comprises:

a step of inputting the integer variable $\chi$, the rational point S, and the rational point Q into respective predetermined registers by causing the CPU of the electronic computer to function as an input unit;

a step of computing f by causing the CPU of the electronic computer to function as a computation unit;

a step of computing a value of a straight line passing through given rational points at a rational point $Q(x_Q, y_Q)$ by causing the CPU of the electronic computer to function as a computation unit;

a step of computing f'$_{\chi,S}$(Q) using said f and said value by causing the CPU of the electronic computer to function as a computation unit; and a step of computing the pairing e(S, Q) using said f'$_{\chi,S}$(Q) as
[F48]

$$e(S, Q) = f'_{\chi,S}(Q)^{(p^k-1)/r}$$

by causing the CPU of the electronic computer to function as a computation unit.

According to a further aspect of the present invention, there is provided a pairing computation program in which, as described in claim 15, an elliptic curve is given as $y^2 = x^3 + ax + b$, $a \in F_p$, $b \in F_p$, letting k be an embedding degree, E be an additive group constituted of rational points on the pairing enabled elliptic curve defined over an extension field $F_p^k$, E[r] be a set of rational points having a prime order r, and $\phi_p$ be a Frobenius endomorphism, a pairing e is defined using $$G_1 = E[r] \cap \mathrm{Ker}(\phi_p - [1]),$$

$$G_2 = E[r] \cap \mathrm{Ker}(\phi_p - [p]),$$

as non-degenerate bilinear map $$e: G_1 \times G_2 \to F_p^{*k}/(F_p^{*k})^r,$$

the pairing computation program causes an electronic computer which includes a CPU to compute the pairing e(S, Q), by letting $S \in G_1$, $Q \in G_2$, $\chi$ be a given integer variable, and f be a rational function which is calculated using Miller's algorithm, the order r and a trace t of the Frobenius endomorphism $\phi_p$ are specified preliminarily according to the embedding degree k using the integer variable $\chi$, and the pairing computation program causes the CPU of the electronic computer to function as:

an input unit which inputs the integer variable $\chi$, the rational point S, and the rational point Q into respective predetermined registers;

a computation unit which computes f;

a computation unit which computes a value of a straight line passing through given rational points at a rational point $Q(x_Q, y_Q)$;

a computation unit which computes f'$_{\chi,S}$(Q) using said f and said value; and a computation unit which computes the pairing e (S, Q) using said f'$_{\chi,S}$(Q) as
[F49]

$$e(S, Q) = f'_{\chi,S}(Q)^{(p^k-1)/r}.$$

According to a further aspect of the present invention, there is provided a pairing computation device, in which, as described in claim 16, an elliptic curve is given as $y^2 = x^3 + b$, $b \in F_p$, letting an embedding degree be 12, E be an additive group constituted of rational points on the pairing enabled elliptic curve defined over an extension field $F_p^{12}$, E[r] be a set of rational points having a prime order r, and $\phi_p$ be a Frobenius endomorphism, a pairing e is defined using $$G_1 = E[r] \cap \mathrm{Ker}(\phi_p - [1]),$$

$$G_2 = E[r] \cap \mathrm{Ker}(\phi_p - [p]),$$

as a non-degenerate bilinear map $$e: G_1 \times G_2 \to F_p^{*12}/(F_p^{*12})^r,$$

the pairing computation device comprises a CPU which computes the pairing e(S, Q), by letting $S \in G_1$, $Q \in G_2$, $\chi$ be a given integer variable, $f_{2\chi,S}(Q)$ be a rational function which is calculated using Miller's algorithm, the order r and a trace t of the Frobenius endomorphism $\phi_p$ are specified using the integer variable $\chi$ as, $$r(\chi) = 36\chi^4 - 36\chi^3 + 18\chi^2 - 6\chi + 1,$$

$$t(\chi) = 6\chi^2 + 1,$$

a representation of the integer variable $\chi$ using $p^{10}$ with p as a characteristic is $$p \equiv (2\chi - 1)p^{10} + 2\chi(\mathrm{mod}\, r(\chi)) \text{ and}$$

the CPU includes:

an input unit which inputs the integer variable $\chi$, the rational point S, and the rational point Q into respective predetermined registers;

a first computation unit which computes $f_{2\chi,S}(Q)$ and $f_{2\chi,pS}(Q)$;

a second computation unit which computes given rational points using $2\chi S$ and $2\chi pS$ which are calculated when computing said $f_{2\chi,S}(Q)$ and $f_{2\chi,pS}(Q)$;

a third computation unit which computes a value at a rational point $Q(x_Q, y_Q)$ of a straight line passing through the given rational points;

a fourth computation unit which computes f'$_{\chi,S}$(Q) using said $f_{2\chi,S}(Q)$ and said value; and a fifth computation unit which computes the pairing e(S, Q) using said $f'_{\chi,S}(Q)$ as

[F50]

$$e(S, Q) = f'_{\chi,S}(Q)^{(p^{12}-1)/r}.$$

In particular, the pairing computation device is characterized in that the second computation unit computes respective rational points $-S$, $(2\chi-1)S$, $p^{10}((2\chi-1)S)$, $-pS$, $(2\chi-1)pS$, $p^{10}((2\chi-1)pS$ in order using previously obtained results, the third computation unit respectively computes a value $l_1$ at a rational point $Q(x_Q, y_Q)$ of a straight line passing through rational points $((2\chi-1)S, -S)$, a value $l_2$ at the rational point $Q(x_Q, y_Q)$ of a straight line passing through rational points $(p^{10}((2\chi-1)S), 2\chi S)$, a value $l_3$ at the rational point $Q(x_Q, y_Q)$ of a straight line passing through rational points $((2\chi-1)pS, -pS)$, and a value $l_4$ at the rational point $Q(x_Q, y_Q)$ of a straight line passing through rational points $(p^{10}((2\chi-1)pS), 2\chi pS)$, and the fourth computation unit computes $f'_{\chi,S}(Q)$ using the values of the rational point $Q(x_Q, y_Q)$ $l_1, l_2, l_3, l_4$ as

[F51]

$$f'_{\chi,S}(Q) = (\{f_{2\chi,S}(Q) \cdot l_1 {}^{-1}_{l_{10}}\}^{p^{10}} \cdot f_{2\chi,S}(Q) \cdot l_2)^p \cdot \{f_{2\chi,pS}(Q) \cdot l_3{}^{-1}\}^p \cdot f_{2\chi,pS}(Q) \cdot l_4.$$

According to a further aspect of the present invention, there is provided a pairing computation method, in which, as described in claim 18, an elliptic curve is given as $y^2 = x^3 + b$, $b \in F_p$, letting an embedding degree be 12, E be an additive group constituted of rational points on the pairing enabled elliptic curve defined over an extension field $F_p{}^{12}$, E[r] be a set of rational points having a prime order r, and $\phi_p$ be a Frobenius endomorphism, a pairing e is defined using $$G_1 = E[r] \cap \mathrm{Ker}(\phi_p - [1]),$$

$$G_2 = E[r] \cap \mathrm{Ker}(\phi_p - [p]),$$

as non-degenerate bilinear map $$e: G_1 \times G_2 \to F^*_p{}^{12}/(F^*_p{}^{12})^r,$$

an electronic computer which includes a CPU computes the pairing e (S, Q), by letting $S \in G_1$, $Q \in G_2$, $\chi$ be a given integer variable, and $f_{2\chi,S}(Q)$ be a rational function which is calculated using Miller's algorithm, the order r and a trace t of the Frobenius endomorphism $\phi_p$ are specified using the integer variable $\chi$ as, $$r(\chi) = 36\chi^4 - 36\chi^3 + 18\chi^2 - 6\chi + 1,$$

$$t(\chi) = 6\chi^2 + 1,$$

a representation of the integer variable $\chi$ using $p^{10}$ with p as a characteristic is $$p \equiv (2\chi-1)p^{10} + 2\chi(\mathrm{mod}\, r(\chi)), \text{ and}$$

the pairing computation method comprises:

an input step which inputs the integer variable $\chi$, the rational point S, and the rational point Q into respective predetermined registers by causing the CPU of the electronic computer to function as an input unit;

a first computation step which computes $f_{2\chi,S}(Q)$ and $f_{2\chi,pS}(Q)$ by causing the CPU of the electronic computer to function as a first computation unit;

a second computation step which computes given rational points using $2\chi S$ and $2\chi pS$ which are calculated when computing said $f_{2\chi,S}(Q)$ and $f_{2\chi,pS}(Q)$ by causing the CPU of the electronic computer to function as a second computation unit;

a third computation step which computes a value at a rational point $Q(x_Q, y_Q)$ of a straight line passing through the given rational points by causing the CPU of the electronic computer to function as a third computation unit;

a fourth computation step which computes $f'_{\chi,S}(Q)$ using said $f_{2\chi,S}(Q)$ and said value by causing the CPU of the electronic computer to function as a fourth computation unit; and a fifth computation step which computes the pairing e(S, Q) using said $f'_{\chi,S}(Q)$ as

[F52]

$$e(S, Q) = f'_{\chi,S}(Q)^{(p^{12}-1)/r},$$

by causing the CPU of the electronic computer to function as a fifth computation unit.

In particular, the pairing computation method is characterized in that the second computation step computes respective rational points $-S$, $(2\chi-1)S$, $p^{10}((2\chi-1)S)$, $-pS$, $(2\chi-1)pS$, $p^{10}((2\chi-1)pS$ in order using previously obtained results, the third computation step respectively computes a value $l_1$ at a rational point $Q(x_Q, y_Q)$ of a straight line passing through rational points $((2\chi-1)S, -S)$, a value $l_2$ at the rational point $Q(x_Q, y_Q)$ of a straight line passing through rational points $(p^{10}((2\chi-1)S), 2\chi S)$, a value $l_3$ at the rational point $Q(x_Q, y_Q)$ of a straight line passing through rational points $((2\chi-1)pS, -pS)$, and a value $l_4$ at the rational point $Q(x_Q, y_Q)$ of a straight line passing through rational points $(p^{10}((2\chi-1)pS), 2\chi pS)$, and the fourth computation step computes $f'_{\chi,S}(Q)$ using the values of the rational point $Q(x_Q, y_Q)$ $l_1, l_2, l_3, l_4$ as $$f'_{\chi,S}(Q) = (\{f_{2\chi,S}(Q) \cdot l_1 {}^{-1}_{l_{10}}\}^{p^{10}} \cdot f_{2\chi,S}(Q) \cdot l_2)^p \cdot \{f_{2\chi,pS}(Q) \cdot l_3{}^{-1}\}^p \cdot f_{2\chi,pS}(Q) \cdot l_4.$$

According to a further aspect of the present invention, there is provided a pairing computation program, in which, as described in claim 20, an elliptic curve is given as $y^2 = x^3 b$, $b \in F_p$, letting an embedding degree be 12, E be an additive group constituted of rational points on the pairing enabled elliptic curve defined over an extension field $F_p{}^{12}$, E[r] be a set of rational points having a prime order r, and $\phi_p$ be a Frobenius endomorphism, a pairing e is defined using $$G_1 = E[r] \cap \mathrm{Ker}(\phi_p - [1]),$$

$$G_2 = E[r] \cap \mathrm{Ker}(\phi_p - [p]),$$

as non-degenerate bilinear map $$e: G_1 \times G_2 \to F^*_p{}^{12}/(F^*_p{}^{12})^r, \text{ and}$$

the pairing computation program causes an electronic computer which includes a CPU to compute the pairing e(S, Q), by letting $S \in G_1$, $Q \in G_2$, $\chi$ be a given integer variable, and $f_{2\chi,S}(Q)$ $^{and}$ $f_{2\chi,pS}(Q)$ be a rational function which is calculated using Miller's algorithm, the order r and a trace t of the Frobenius endomorphism $\phi_p$ are specified using the integer variable $\chi$ as, $$r(\chi) = 36\chi^4 - 36\chi^3 + 18\chi^2 - 6\chi + 1,$$

$$t(\chi) = 6\chi^2 + 1,$$

a representation of the integer variable $\chi$ using $p^{10}$ with p as a characteristic is $$p \equiv (2\chi-1)p^{10} + 2\chi(\mathrm{mod}\, r(\chi)), \text{ and}$$

the pairing computation program causes the CPU of the electronic computer to function as:

an input unit which inputs the integer variable $\chi$, the rational point S, and the rational point Q into respective predetermined registers;

a first computation unit which computes $f_{2\chi,S}(Q)$ and $f_{2\chi,pS}(Q)$;

a second computation unit which computes given rational points using $2\chi S$ and $2\chi pS$ which are calculated when computing said $f_{2\chi,S}(Q)$ and $f_{2\chi,pS}(Q)$;

a third computation unit which computes a value at a rational point $Q(x_Q, y_Q)$ of a straight line passing through the given rational points;

a fourth computation unit which computes $f'_{\chi,S}(Q)$ using said $f_{2\chi,S}(Q)$ and said value; and a fifth computation unit which computes the pairing $e(S, Q)$ using said $f'_{\chi,S}(Q)$ as

[F54]

$$e(S, Q) = f'_{\chi,S}(Q)^{(p^{12}-1)/r}.$$

In particular, the pairing computation program is characterized in that the pairing computation program causes:

the CPU of the electronic computer which functions as the second computation unit to compute respective rational points $-S$, $(2\chi-1)S$, $p^{10}((2\chi-1)S)$, $-pS$, $(2\chi-1)pS$, $p^{10}((2\chi-1)pS)$ in order using previously obtained results;

the CPU of the electronic computer which functions as the third computation unit to respectively compute a value $l_1$ at a rational point $Q(x_Q, y_Q)$ of a straight line passing through rational points $((2\chi-1)S, -S)$, a value $l_2$ at the rational point $Q(x_Q, y_Q)$ of a straight line passing through rational points $(p^{10}((2\chi-1)S), 2\chi S)$, a value $l_3$ at the rational point $Q(x_Q, y_Q)$ of a straight line passing through rational points $((2\chi-1)pS, -pS)$, and a value $l_4$ at the rational point $Q(x_Q, y_Q)$ of a straight line passing through rational points $(p^{10}((2\chi-1)pS), 2\chi pS)$; and the CPU of the electronic computer which functions as the fourth computation unit to compute $f'_{\chi,S}(Q)$ using the values at the rational point $Q(x_Q, y_Q)$ $l_1, l_2, l_3, l_4$ as

[F55]

$$f'_{\chi,S}(Q) = (\{f_{2\chi,S}(Q) \cdot l_{1_{10}}^{-1}\}^{p^{10}} \cdot f_{2\chi,S}(Q) \cdot l_2)^p \cdot \{f_{2\chi,pS}(Q) \cdot l_3^{-1}\}^p \cdot f_{2\chi,pS}(Q) \cdot l_4.$$

According to a further aspect of the present invention, there is provided a pairing computation device, in which, as described in claim 22, an elliptic curve is given as $y^2 = x^3 + ax$, $a \in F_p$, letting an embedding degree be 8, E be an additive group constituted of rational points on the pairing enabled elliptic curve defined over an extension field $F_p^8$, $E[r]$ be a set of rational points having a prime order r, and $\phi_p$ be a Frobenius endomorphism, a pairing e is defined using $$G_1 = E[r] \cap \text{Ker}(\phi_p - [1]),$$

$$G_2 = E[r] \cap \text{Ker}(\phi_p - [p]),$$

as non-degenerate bilinear map $$e: G_1 \times G_2 \to F^*_{p^8}/(F^*_{p^8})^r, \text{ and}$$

the pairing computation device comprises a CPU which computes the pairing $e(S, Q)$, by letting $S \in G_1$, $Q \in G_2$, $\chi$ be a given integer variable, and $f_{3\chi,S}(Q)$ be a rational function which is calculated using Miller's algorithm, the order r and a trace t of the Frobenius endomorphism $\phi_p$ are specified using the integer variable $\chi$ as, $$r(\chi) = 9\chi^4 + 12\chi^3 + 8\chi^2 + 4\chi + 1,$$

$$t(\chi) = -9\chi^3 - 3\chi^2 - 2\chi,$$

a representation of the integer variable $\chi$ using $p^2$ and $p^3$ with p as a characteristic is $$p^3 = p^2 + 3\chi + 1 (\text{mod} r(\chi)) \text{ and}$$

the CPU includes:

an input unit which inputs the integer variable $\chi$, the rational point S, and the rational point Q into respective predetermined registers;

a first computation unit which computes $f_{3\chi,S}(Q)$ and $f_{3\chi,p^3S}(Q)$;

a second computation unit which computes respective rational points $p^2(S)$, $(3\chi+1)S$, $p^2(p^3S)$, $(3\chi+1)p^3S$ in order using previously obtained results;

a third computation unit respectively computes a value $l_5$ at a rational point $Q(x_Q, y_Q)$ of a straight line passing through rational points $(3\chi S, S)$, a value $l_6$ at the rational point $Q(x_Q, y_Q)$ of a straight line passing through rational points $(p^2(S), (3\chi+1)S)$, a value $l_7$ at the rational point $Q(x_Q, y_Q)$ of a straight line passing through rational points $(3\chi p^3 S, p^3 S)$, and a value $l_8$ at the rational point $Q(x_Q, y_Q)$ of a straight line passing through rational points $(p^2(p^3 S), (3\chi+1)p^3 S)$; and the fourth computation unit which computes $f'_{\chi,S}(Q)$ using the computation result of the first computation unit and the computation result of the third computation unit as

[F56]

$$f'_{\chi,S}(Q) = (f_{3\chi,S}(Q) \cdot l_5 \cdot l_6)^{p^5} \cdot f_{3\chi,p^3}3_S(Q) \cdot l_7 \cdot l_8; \text{ and}$$

a fifth computation unit which computes the pairing $e(S, Q)$ using said $f'_{\chi,S}(Q)$ as

[F57]

$$e(S, Q) = f'_{\chi,S}(Q)^{(p^9-1)/r}.$$

According to a further aspect of the present invention, there is provided a pairing computation method, in which, as described in claim 23, an elliptic curve is given as $y^2 = x^3 + ax$, $a \in F_p$, letting an embedding degree be 8, E be an additive group constituted of rational points on the pairing enabled elliptic curve defined over an extension field $F_p^8$, $E[r]$ be a set of rational points having a prime order r, and $\phi_p$ be a Frobenius endomorphism, a pairing e is defined using $$G_1 = E[r] \cap \text{Ker}(\phi_p - [1]),$$

$$G_2 = E[r] \cap \text{Ker}(\phi_p - [p]),$$

as non-degenerate bilinear map $$e: G_1 \times G_2 \to F^*_{p^8}/(F^*_{p^9})^r,$$

an electronic computer which includes a CPU computes the pairing $e(S, Q)$, by letting $S \in G_1$, $Q \in G_2$, $\chi$ be a given integer variable, and $f_{3\chi,S}(Q)$ be a rational function which is calculated using Miller's algorithm, the order r and a trace t of the Frobenius endomorphism $\phi_p$ are specified using the integer variable $\chi$ as, $$r(\chi) = 9\chi^4 + 12\chi^3 + 8\chi^2 + 4\chi + 1,$$

$$t(\chi) = -9\chi^3 - 3\chi^2 - 2\chi,$$

a representation of the integer variable $\chi$ using $p^2$ and $p^3$ with p as a characteristic is $$p^3 = p^2 + 3\chi + 1 (\text{mod} r(\chi)) \text{ and}$$

the pairing computation method comprises:

an input step which inputs the integer variable $\chi$, the rational point S, and the rational point Q into respective predetermined registers by causing the CPU of the electronic computer to function as an input unit;

a first computation step which computes $f_{3\chi,S}(Q)$ and $f_{3\chi,p^3S}(Q)$ by causing the CPU of the electronic computer to function as a first computation unit;

a second computation step which computes respective rational points $p^2(S)$, $(3\chi+1)S$, $p^2(p^3S)$, $(3\chi+1)p^3S$ in order using previously obtained results by causing the CPU of the electronic computer to function as a second computation unit;

a third computation step which respectively computes a value $l_5$ at a rational point $Q(x_Q, y_Q)$ of a straight line passing through rational points $(3\chi S, S)$, a value $l_6$ at the rational point $Q(x_Q, y_Q)$ of a straight line passing through rational points $(p^2(S), (3\chi+1)S)$, a value $l_7$ at the rational point $Q(x_Q, y_Q)$ of a straight line passing through rational points $(3\chi p^3 S, p^3 S)$, and a value $l_8$ at the rational point $Q(x_Q, y_Q)$ of a straight line passing through rational points $(p^2(p^3S), (3\chi+1)p^3S)$ by causing the CPU of the electronic computer to function as a third computation unit; and a fourth computation step which computes $f'_{\chi,S}(Q)$ using the values $l_5, l_6, l_7, l_8$ as
[F58]

$$f'_{\chi,S}(Q) = (f_{3\chi,S}(Q) \cdot l_5 \cdot l_6)^{pds} \cdot {}^3 f_{3\chi,p3S}(Q) \cdot l_7 \cdot l_8;$$

by causing the CPU of the electronic computer to function as a fourth computation unit; and a fifth computation step which computes the pairing $e(S, Q)$ using said $f'_{\chi,S}(Q)$ as
[F59]

$$e(S, Q) = f_{\chi,S}(Q)^{(p^8-1)/r}$$

by causing the CPU of the electronic computer to function as a fifth computation unit.

According to a further aspect of the present invention, there is provided a pairing computation program, in which, as described in claim 24, an elliptic curve is given as $y^2 = x^3 + ax$, $a \in F_p$, letting an embedding degree be 8, E be an additive group constituted of rational points on the pairing enabled elliptic curve defined over an extension field $F_p^8$, E[r] be a set of rational points having a prime order r, and $\phi_p$ be a Frobenius endomorphism, a pairing e is defined using $$G_1 = E[r] \cap \mathrm{Ker}(\phi_p - [1]),$$

$$G_2 = E[r] \cap \mathrm{Ker}(\phi_p - [p]),$$

as non-degenerate bilinear map $$e: G_1 \times G_2 \rightarrow F_p^{*8}/(F_p^{*8})^r,$$

the pairing computation program causes an electronic computer which includes a CPU to compute the pairing e (S, Q), by letting $S \in G_1$, $Q \in G_2$, $\chi$ be a given integer variable, and $f_{3\chi,S}(Q)$ be a rational function which is calculated using Miller's algorithm, the order r and a trace t of the Frobenius endomorphism $\phi_p$ are specified using the integer variable $\chi$ as, $$r(\chi) = 9\chi^4 + 12\chi^3 + 8\chi^2 + 4\chi + 1,$$

$$t(\chi) = -9\chi^3 - 3\chi^2 - 2\chi,$$

a representation of the integer variable $\chi$ using $p^2$ and $p^3$ with p as a characteristic is $$p^3 \equiv p^2 + 3\chi + 1 (\mathrm{mod} r(\chi))\ \mathrm{and}$$

the pairing computation program causes the CPU of the electronic computer to function as:

an input unit which inputs the integer variable $\chi$, the rational point S, and the rational point Q into respective predetermined registers;

a first computation unit which computes $f_{3\chi,S}(Q)$ and $f_{3\chi,p^3S}(Q)$;

a second computation unit which computes respective rational points $p^2(S)$, $(3\chi+1)S$, $p^2(p^3S)$, $(3\chi+1)p'S$ in order using previously obtained results;

a third computation unit which respectively computes a value $l_5$ at a rational point $Q(x_Q, y_Q)$ of a straight line passing through rational points $(3\chi S, S)$, a value $l_6$ at the rational point $Q(x_Q, y_Q)$ of a straight line passing through rational points $(p^2(S), (3\chi+1)S)$, a value $l_7$ at the rational point $Q(x_Q, y_Q)$ of a straight line passing through rational points $(3\chi p^3 S, p^3 S)$, and a value $l_8$ at the rational point $Q(x_Q, y_Q)$ of a straight line passing through rational points $(p^2(p^3S), (3\chi+1)p^3S)$; and a fourth computation unit which computes $f'_{\chi,S}(Q)$ using the values $l_5, l_6, l_7, l_8$ as
[F60]

$$f'_{\chi,S}(Q) = (f_{2\chi,S}(Q) \cdot l_5 \cdot l_6)^{p^8} f_{3\chi,p^8S}(Q) \cdot l_7 \cdot l_8;\ \mathrm{and}$$

a fifth computation unit which computes the pairing $e(S, Q)$ using said $f'_{\chi,S}(Q)$ as
[F61]

$$e(S, Q) = f_{\chi,S}(Q)^{(p^8-1)/r}.$$

According to the present invention, it is possible to calculate a rational function at high speed by making the rational function a function of an integer variable $\chi$, thus enabling high speed pairing computation.

DESCRIPTION OF THE PREFERRED EMBODIMENTS

Figure 1:
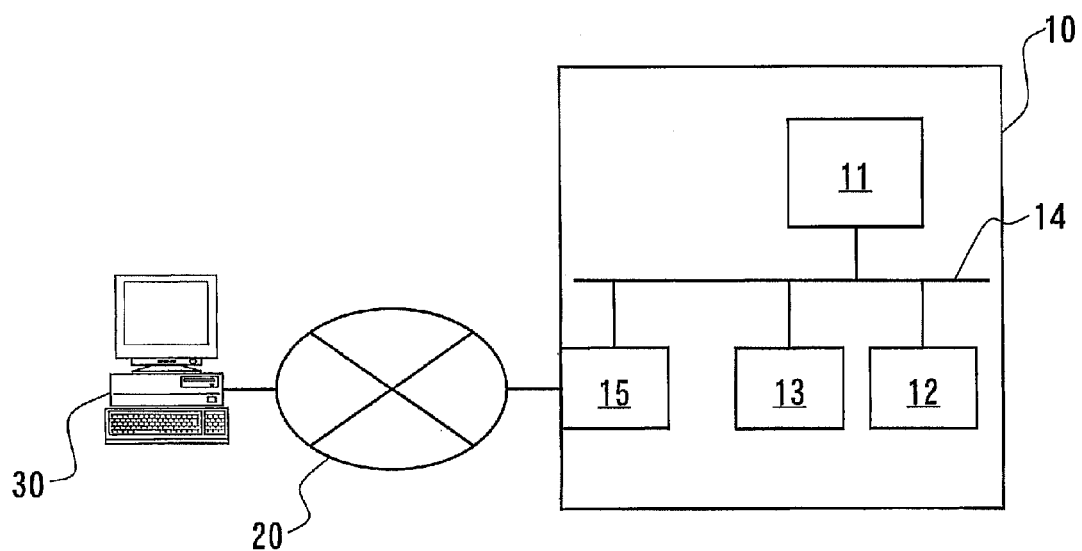
FIG. 1 is a schematic diagram of a pairing computation device according to an embodiment of the present invention.

In a pairing computation device, a pairing computation method and a pairing computation program according to the present invention, out of a first step which computes a rational function using Miller's algorithm in pairing computation and a second step which performs exponentiation of a result of the computation, the first step computes the rational function using an integer variable $\chi$, thereby speeding up the pairing computation.

That is, in a conventional pairing computation, in which an elliptic curve is given as $y^2 = x^3 + ax + b$, $a \in F_p$, $b \in F_p$, letting k be an embedding degree, E be an additive group constituted of rational points on the pairing enabled elliptic curve defined over an extension field $F_p^k$, $E[r]$ be a set of rational points having a prime order r, and $\phi_p$ be a Frobenius endomorphism, a pairing e is defined using $$G_1 = E[r] \cap \mathrm{Ker}(\phi_p - [1]),$$

$$G_2 = E[r] \cap \mathrm{Ker}(\phi_p - [p]),$$

as non-degenerate bilinear map $$e: G_1 \times G_2 \to F_p^{*k}/(F_p^{*k})^r,$$

a pairing $\alpha(S, Q)$ is computed, using $S \in G_1$, $Q \in G_2$, a given integer variable $\chi$, and a rational function $f_{(t-1)^2, S}(Q)$ which is calculated using Miller's algorithm, as
[F62]

$$\alpha(S, Q) = f_{(t-1)^2, S}(Q)^{(p^k-1)/r}.$$

This is known as Twisted Ate pairing.

On the other hand, the inventors have found out a new pairing which enables fast pairing computation as a non-degenerate bilinear map by using an integer variable $\chi$ on an elliptic curve as below $$e: G_1 \times G_2 \to F_p^{*k}/(F_p^{*k})^r.$$

This pairing is hereinafter referred to as "Twisted Xate pairing". Further, it is possible to perform further faster pairing computation by applying multi-pairing technique which calculates a plurality of pairing products. This pairing is hereinafter referred to as "Twisted Xate multi-pairing" That is, the pairing computation device, the pairing computation method, and the pairing computation program all according to the present invention make it possible to perform fast pairing computation by using Twisted Xate pairing and Twisted Xate multi-pairing.

In particular, elliptic curves have been known as pairing friendly curves according to embedding degrees respectively. For example, when an embedding degree is 12, there has been known that an order r and a trace t of the Frobenius endomorphism $\phi_p$ are expressed using a integer variable $\chi$ as $$r(\chi) = 36\chi^4 - 36\chi^3 + 18\chi^2 - 6\chi + 1,$$

$$t(\chi) = 6\chi^2 + 1.$$

Further, when the embedding degree is 8, there has been known that r ($\chi$) and t ($\chi$) are expressed as $$r(\chi) = 9\chi^4 + 12\chi^3 + 8\chi^2 + 4\chi + 1,$$

$$t(\chi) = -9\chi^3 - 3\chi^2 - 2\chi.$$

Hereinafter, a case where an embedding degree is 12 is explained as an example. Accordingly, as mentioned above, $$r(\chi) = 36\chi^4 - 36\chi^3 + 18\chi^2 - 6\chi + 1 \quad \text{(Equation 1)}$$

$$t(\chi) = 6\chi^2 + 1 \quad \text{(Equation 2)}$$

From (Equation 2), $$6\chi^2 = t - 1 \equiv p \pmod{r} \quad \text{(Equation 3)}$$

Here, it is used that a characteristic p is expressed as $$p = r + t - 1 \quad \text{(Equation 4)}$$

Accordingly, (Equation 1) is transformed as $$p^2 - 6\chi p + 3p - 6\chi + 1 \equiv 0 \pmod{r}$$

$$(-6\chi + 3)p \equiv -p^2 + 6\chi - 1 \pmod{r} \quad \text{(Equation 5)}$$

By squaring both sides of (Equation 5), the following equation is obtained.

$$(6\chi - 3)^2 p^2 \equiv (p^2 - 6\chi + 1)^2 \pmod{r}$$

$$36\chi^2 p^2 - 36\chi p^2 + 9p^2 \equiv p^4 - 12\chi p^2 + 2p^2 + 36\chi^2 - 12\chi + 1 \pmod{r} \quad \text{(Equation 6)}$$

Here, from already known relation equation $p^4 + 1 \equiv p^2 \pmod{r}$, $$36\chi^2 p^2 - 36\chi p^3 + 9p^2 \equiv -12\chi p^2 + 3p^2 + 36\chi^2 - 12\chi \pmod{r},$$

$$36\chi^2 (p^2 - 1) \equiv (24\chi - 6)p^2 - 12\chi \pmod{r},$$

$$6\chi^2 (p^2 - 1) \equiv (4\chi - 1)p^2 - 2\chi \pmod{r} \quad \text{(Equation 7)}$$

are obtained and by multiplying both sides of (Equation 7) by $(p^2 - 1)^{-1}$ $$6\chi^2 \equiv -(4\chi - 1)p^4 + 2\chi p^2 \quad \text{(Equation 8)}$$

is obtained. Here, $(p^2 - 1)^{-1}$ can be obtained based on relation equation of $p^4 - p^2 + 1 \equiv 0 \pmod{r}$ and $\gcd(p^4 - p^2 + 1, p^2 - 1) = 1$, as follows.

$$p^4 - p^2 + 1 \equiv 0 \pmod{r}$$

$$-p^2 (p^2 - 1) \equiv 1 \pmod{r}$$

$$(p^2 - 1)^{-1} \equiv -p^2 \pmod{r} \quad \text{(Equation 9)}$$

From the relation equation $p^2 \equiv p^4 + 1 \pmod{r}$, $$6x^2 \equiv -(4x - 1)p^4 + 2x(p^4 + 1) \quad \text{(Equation 10)}$$
$$\equiv -(2x - 1)p^4 + 2x \pmod{r}$$

is obtained. Based on (Equation 3) and $p^6 \equiv -1 \pmod{r}$, $$p \equiv (2\chi - 1)p^{10} + 2\chi \quad \text{(Equation 11)}$$

is obtained.

Next, a rational function $f_{(t-1)^2 \mod r, S}(\cdot)$ of Twisted Ate pairing is considered. In particular, from (Equation 3),
[F63]

$$f_{p^2 \mod r, S} = f_{(t-1)^2 \mod r, S} \quad \text{(Equation 12)}$$

Here, $S \in G_1$ and with respect to $Q \in G_2$,
[F64]

$$f_{p^2 \mod r, S}(Q)^{(p^{12}-1)/r} = f_{(t-1)^2, S}(Q)^{(p^{12}-1)/r} = \alpha(S, Q) \quad \text{(Equation 13)}$$

Further, a rational function has relationships as follows.

$$f_{a+b, S} = f_{a, S} \cdot f_{b, S} \cdot g_{aS, bS}, \quad \text{(Equation 14a)}$$

$$f_{a-b, S} = f_{a, S} \cdot \{f_{b, S} \cdot g_{(a-b)S, bS}\}^{-1} \quad \text{(Equation 14b)}$$

$$f_{ab, S} = f^b_{a, S} \cdot f_{a, bS} = f^a_{b, S} \cdot f_{b, aS} \quad \text{(Equation 14c)}$$

Here, $g_{aS, bS} = l_{aS, bS}/v_{aS+bS}$, and $l_{aS, bS}$ is a value of a straight line passing through two rational points aS and bS, and $v_{aS+bS}$ is a value of a vertical line at a rational point aS+bS. In a case of the embedding degree being an even number, calculation of $v_{aS+bS}$ can be omitted.

Based on (Equation 14c), (Equation 12) becomes as follows.
[F65]

$$f_{p^2, S} = f_{p, S}^p \cdot f_{p, pS} \quad \text{(Equation 15)}$$

And using (Equation 11), it becomes
[F66]

$$f_{p, S}^p \cdot f_{p, pS} = f_{(2\chi-1)p^{10} + 2\chi, S}^p \cdot f_{(2\chi-1)p^{10} + 1\chi, S} \quad \text{(Equation 16)}$$

Further, based on (Equation 14a) and (Equation 14b), it becomes
[F67]

$$f_{p, S}^p \cdot f_{p, pS} = (\{f_{2\chi, S} \cdot \{g_{(2\chi-1)S, -S}\}^{-1}\}^{p^{10}} \cdot f_{p^{10}, (2\chi-1)S} \cdot f_{2\chi, S} \cdot g_{(2\chi-1)p^{10}, 2\chi S})^p \cdot \{f_{2\chi, pS} \cdot \{g_{(2\chi-1)p^{10}S, 2\chi S}\}^{-1}\}^{p^{10}} \cdot f_{p_{10}, (2\chi-1)pS} \cdot f_{2\chi, pS} \cdot g_{(2\chi-1)p^{10} pS, 2\chi pS} \quad \text{(Equation 17)}$$

In addition, since in (Equation 17),
[F68]

$$f_{p^{10},(2\chi-1)}^{p} \cdot f_{p^{10},(2\chi-1)pS} \quad \text{(Equation 18)}$$

has a property of bilinearity, (Equation 17) can be transformed as follows.
[F69]

$$f_{p,S}^{p} \cdot f_{p,pS} \cdot \{f_{p^{10},(2\chi-1)S}^{p} \cdot f_{p^{10},(2\chi-1)pS}\}^{-1} = \\
(\{f_{2\chi,S} \cdot \{g_{(2\chi-1)S,-S}\}^{-1}\}^{p} \cdot f_{2\chi,S}' \cdot \\
g_{(2\chi-1)p^{10}S,2\chi S})^{p} \cdot \{f_{2\chi,pS} \cdot \\
\{g_{(2\chi-1)pS,-pS}\}^{-1}\}^{p^{10}} \cdot f_{2\chi,pS} \cdot g_{(2\chi-1)p^{10}pS,2\chi pS} \quad \text{(Equation 19)}$$

Here, that the left hand side of (Equation 19) has a property of bilinearity brought the inventors to the fact that the right hand side of (Equation 19) also has a property of bilinearity. Accordingly, the inventors have found out Twisted Xate pairing which, using the right hand side of (Equation 19) as a new rational function $f'_{\chi,S}(\cdot)$, computes pairing $e(S, Q)$ as
[F70]

$$e(S, Q) = f'_{\chi,S}(Q)^{(p^{12}-1)/r} \quad \text{(Equation 20)}.$$

In this Twisted Xate pairing, it is possible to obtain $f'_{\chi,S}(Q)$ at high speed by calculating $f_{2\chi,S}(Q)$ and $f_{2\chi,pS}(Q)$ using an integer variable $\chi$ which has a smaller size than $(t-1)^2 \bmod r$ in a computation using Miller's algorithm. However, since two rational points used in these two computations using Miller's algorithm are different respectively, usually (Equation 19) is calculated as follows.

Given $F_1$, $F_2$ as
[F71]

$$F_1\{f_{2\chi,S} \cdot \{g_{(2\chi-1)S,-S}\}^{-1}\}^{p^{10}} \cdot f_{2\chi S} \cdot g_{(2\chi-1)p^{10}S,2\chi S} \quad \text{(Equation 21)}$$

[F72]

$$F_2 = \{g_{2\chi,pS} \cdot \{g_{(2\chi-1)pS,-pS}\}^{-1}\}^{p^{10}} \cdot f_{2\chi,pS} \cdot g_{(2\chi-1)p^{10}pS,2\chi pS} \quad \text{(Equation 22)}$$

(Equation 19) can be expressed as $f'_{\chi,S} = F_1^p \cdot F_2$ using $F_1$ and $F_2$. Since rational point pS which is necessary for calculating $F_2$ is obtained in the course of calculating $F_1$, $F_1$ is calculated first and next, $F_2$ is calculated. In this case, a repetition count of Miller's algorithm becomes $$2[\log_2 \chi] \approx (1/2)[\log_2 r].$$

A basic idea of the present invention is to make $F_1$ and $F_2$ mutually independent calculations by calculating pS preliminarily. Due to this, Twisted Xate pairing according to the present invention can realize parallel processing. To be more specific, in an environment where a multi-pairing which enables parallel processing of a plurality of Miller's algorithm calculations and a CPU having a plurality of cores can be used, thread calculation can be applicable.

Figure 8:
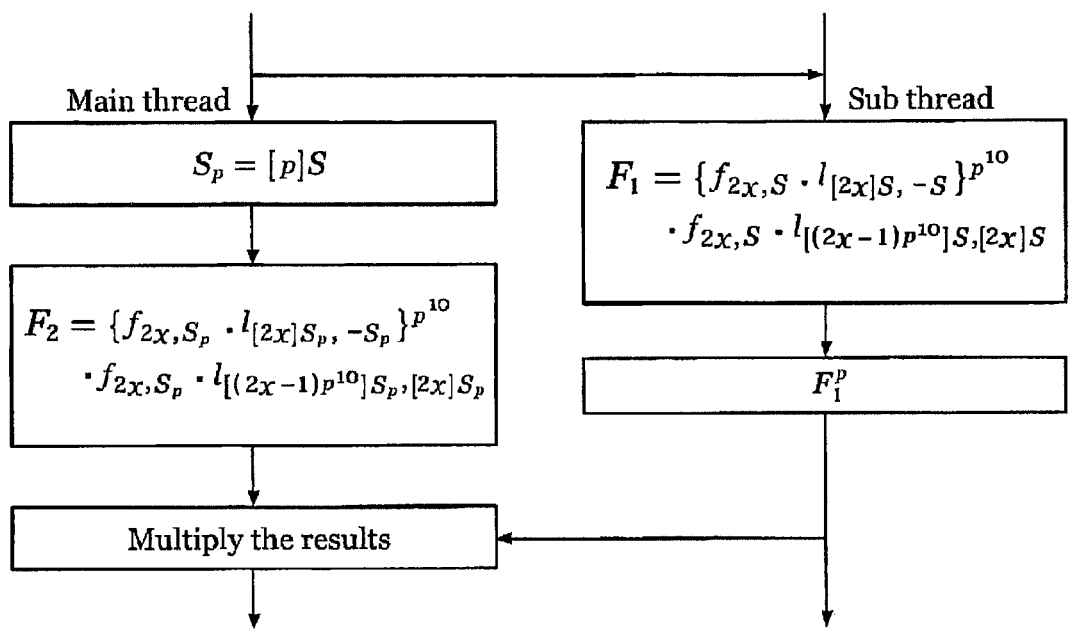
FIG. 8 is a calculation flow in a case where a thread calculation is applied to the Twisted Xate pairing according to the embodiment of the present invention.

<Application of Thread Calculation> pS can be calculated at high speed by means of a scalar multiplication to an extent of $(1/4)[\log_2 r]$ from (Equation 11). By preliminarily calculating pS, $F_1$ and $F_2$ become mutually independent calculations. Accordingly, in an environment where a CPU having a plurality of cores can be used, parallel processing can be realized by assigning calculations of $F_1$ and $F_2$ to respective different cores. FIG. 8 shows a calculation flow in a case where a thread calculation is applied. In this case, a repetition count of Miller's algorithm substantially becomes $(1/4)[\log_2 r]$ from (Equation 21) and (Equation 22).

<Application of Multi-Pairing>

Further, the right hand side of (Equation 19) can be transformed into $$\{f_{2\chi,S}^{p} \cdot f_{2\chi,pS} \cdot \{g_{(2\chi-1)S,-S}^{p} \cdot g_{(2\chi-1)pS,-pS}\}^{-1}\}^{p^{10}} \cdot \\
f_{2\chi,S}^{p} \cdot f_{2\chi,pS} \cdot g_{(2\chi-1)p^{10}S,2\chi S}^{p} \cdot g_{(2\chi-1)pS,2\chi pS} \quad \text{(Equation 23)}$$

From (Equation 23), it is realized that the main calculation of Twisted Xate pairing is $A = f'_{2\chi,S} \cdot f_{2\chi,pS}$. In general, to calculate A, $f_{2\chi,S}$ is calculated first using Miller's algorithm a repetition count of which is given as $2\chi$, and then, $f_{2\chi,pS}$ is calculated. And, A is obtained by taking a product of the two. Here, $f^p_{2\chi,S}$ can be obtained at an extremely small calculation cost by means of the Frobenius endomorphism. Therefore, since Miller's algorithm a repetition count of which is given as $(1/4)[\log_2 r]$ is performed twice, the calculation cost of processing of Twisted Xate pairing by means of Miller's algorithm is given as $(1/2)[\log_2 r]$. The present invention is characterized in that A is obtained by means of Miller's algorithm with respect to multi-pairing (MMA), although in general, A is obtained by independently calculating Miller's algorithm. Using the next relational expression,
[F74]

$$f_{r,S}(Q)^p = f_{r,S}(pQ),$$

A becomes as below.
[F75]

$$A = f_{2\chi,S}(pQ) \cdot f_{23\chi,pS}(Q).$$

By giving A in this way, it can be thought that the calculation of A is a multi-pairing which calculates a product of two pairings. Accordingly, by applying MMA, (Equation 23) can be calculated as follows.
[F76]

$$f'_{\chi,S}(Q) = \{F_{2\chi, Z_S}(Z_Q) \cdot \{g_{(2\chi-1)S,-S}^{p} \cdot \\
g_{(2\chi-1)pS,-pS}\}^{-1}\}^{p^{10}} \cdot F_{2\chi,Z_S}(Z_Q) \cdot g_{(2\chi-1)p^{10}S,2\chi S}^{p} \cdot \\
g_{(2\chi-1)pS,2\chi pS} \quad \text{(Equation 26)}$$

Here, $F_{2\chi,Z_S}$ is obtained by giving $2\chi$ to a repetition count of MMA algorithm and by giving $Z_S$ and $Z_Q$ the following equations respectively.

$$Z_S = \{S, pS\} \quad \text{(Equation 27)}$$

$$Z_Q = \{pQ, Q\} \quad \text{(Equation 28)}$$

By calculating in this way, it becomes possible to reduce the number of square operations over $F_p^{12}$ in Miller's algorithm and the number of inverse element calculations over $F_p$ required for elliptic addition and elliptic doubling to $1/2$ as compared with a case where the calculations by means of Miller's algorithm are performed independently. Here, from (Equation 27) and (Equation 28), pS and pQ are required to be preliminarily calculated for applying MMA to the calculation of A. Since pS can be calculated at high speed by means of scalar multiplication to an extent of $(1/4)[\log_2 r]$ from (Equation 11) and pQ is obtained by means of the Frobenius endomorphism, a calculation cost required for applying the present invention is extremely smaller than a calculation cost which can be reduced by applying MMA.

Heretofore, an explanation is made in a case where an embedding degree is 12. An explanation in a case where the above mentioned embedding degree is 8 is basically the same and hence, detailed explanation is omitted.

Hereinafter, an embodiment of the Twisted Xate pairing in a case where the embedding degree is 12 is explained in detail. In addition, in the present embodiment, digital group signature is assumed and an authentication server constituted of required electronic computer is assumed to be a pairing computation device. However, a pairing computation device is not limited to a case where the pairing computation device is constituted of an authentication server. Provided a device includes at least an arithmetic means such as a CPU and can perform pairing computation, any device may be used as the pairing computation device.

As shown in FIG. 1, an electronic computer 10 which constitutes an authentication server includes: a CPU 11; a storage unit 12 such as a hard disk which stores various kinds of programs such as a pairing computation program, data which is used by the pairing computation program and the like; a memory unit 13 which expands the pairing computation program and makes it executable, temporarily stores data generated in the course of execution of the pairing computation program and is constituted of such as a RAM. In FIG. 1, numeral 14 is a bus.

Further, the electronic computer 10 is connected to a telecommunication line 20 such as the Internet and is configured to be able to receive signature data of digital group signature transmitted from a client device 30 which is connected the telecommunication line 20. In FIG. 1, numeral 15 is an input output control part of the electronic computer 10.

The electronic computer 10, when signature data of the digital group signature is transmitted from the client device 30, stores temporarily the transmitted signature data in the memory unit 13, starts a pairing computation program and performs pairing computation.

Figure 2:
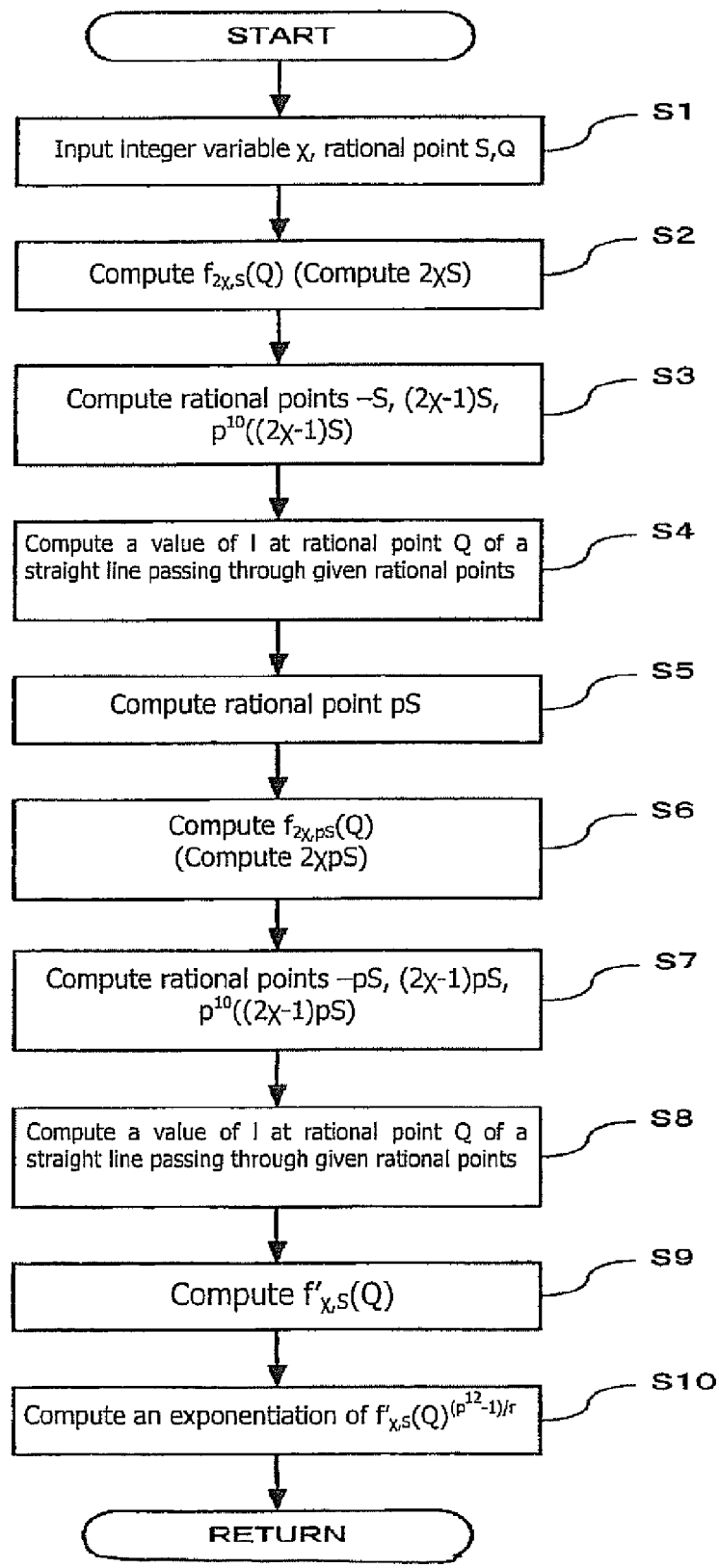
FIG. 2 is a flowchart of a Twisted Xate pairing computation program according to the embodiment of the present invention.

That is, the electronic computer 10, by means of the started pairing computation program, performs pairing computation based on a flowchart shown in FIG. 2 and realizes the digital group signature. Here, an authentication processing in the digital group signature is not explained in detail and only the pairing computation as a subroutine processing in the authentication processing is explained in detail.

The electronic computer 10, causing the CPU 11 to function as an input unit by means of the started pairing computation program, inputs data of an integer variable $\chi$ and data of a rational point S both of which are stored preliminarily in the memory unit 13, and data of a rational point Q temporarily stored in the memory unit 13 as the signature data into predetermined registers provided inside of the CPU 11 respectively. (Step S1).

Next, the electronic computer 10, causing the CPU 11 to function as a first computation unit by means of the pairing computation program, computes a rational function $f_{2\chi,S}(Q)$ by means of Miller's algorithm and stores a result of the computation in the memory unit 13. (Step S2).

Figure 3:
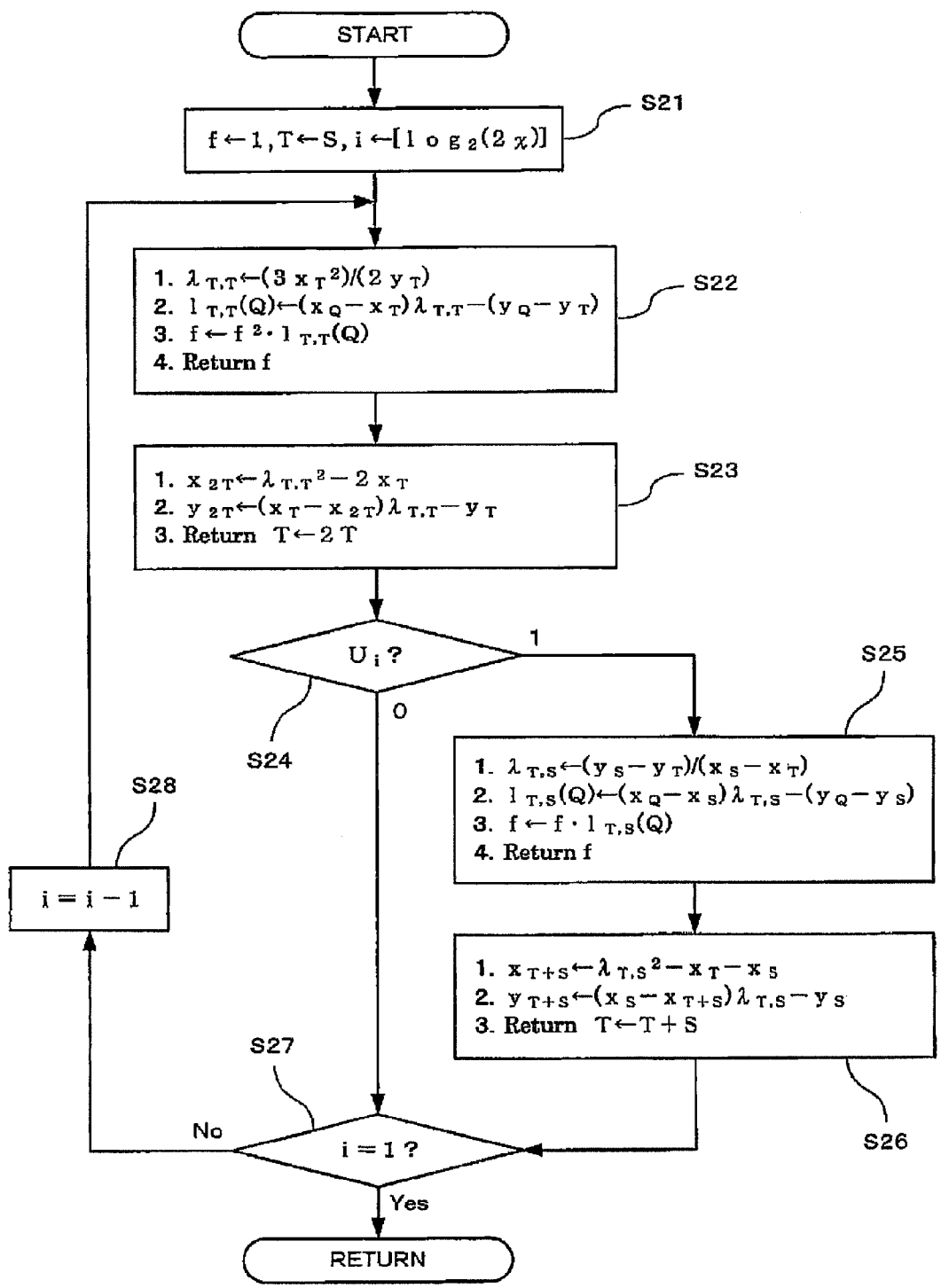
FIG. 3 is a flowchart for computing a rational function $f_{2\chi,S}(Q)$.

The electronic computer 10 performs the computation of the rational function $f_{2\chi,S}(Q)$ specifically as shown in FIG. 3. In particular, in step S2, the electronic computer 10 computes $2\chi S$ as well as the rational function $f_{2\chi,S}(Q)$ and stores results of the computation in the memory unit 13.

That is, firstly, the electronic computer 10, as initial setting, sets f to be 1 and T to be S and also sets the number of bits in a case of binary representation of the integer variable $2\chi$ to be i (Step S21).

Next, the electronic computer 10 performs predetermined computation of the rational function $f_{2\chi,S}(Q)$ part in step S22, performs predetermined computation of $2\chi$ S part in step S23, determines whether $u_i$ which is a value of i-th bit counted from the least degree of the integer variable $2\chi$ is "1" or "0" (Step S24) and, when $u_i=1$, further performs predetermined computation of $f_{2\chi,S}(Q)$ part in step S25 and performs predetermined computation of $2\chi S$ part in step S26.

Next, the electronic computer 10, when (Step S27), decrements i (Step S28), returns to step S22, by repeating the processing until i=1 in step S27 computes the rational function $f_{2\chi,S}(Q)$ and $2\chi S$, and stores results of the computation in the memory unit 13 respectively.

Next, the electronic computer 10, causing the CPU 11 to function as a second computation unit by means of the pairing computation program, reads a value of $2\chi S$ stored in the memory unit 13, performs computation of rational points $-S$, $(2\chi-1)S$, $p^{10}((2\chi-1)S)$ respectively and stores values of the respective rational points in the memory unit 13 respectively. (Step S3).

Next, the electronic computer 10, causing the CPU 11 to function as a third computation unit by means of the pairing computation program, reads values of the respective rational points obtained in step S3 from the memory unit 13 respectively, computes $l_1$ which is a value at a rational point Q ($x_Q$, $y_Q$) of a straight line passing through rational points $((2\chi-1)$ S, $-S)$ and $l_2$ which is a value at the rational point Q ($x_Q$, $y_Q$) of a straight line passing through rational points $(p^{10}((2\chi-1)$ S), $2\chi S)$ respectively, and stores values of $l_1$ and $l_2$ in the memory unit 13 respectively. (Step S4).

To be more specific, the electronic computer 10 computes $l=l_{A,B}(Q)$ as $$\lambda_{A,B} \leftarrow (y_B - y_A)/(x_B - x_A),$$

$$l_{A,B}(Q) \leftarrow (x_Q - x_B)\lambda_{A,B} - (y_Q - y_B).$$

That is, the CPU 11 computes a gradient $\lambda_{A,B}$ using xy coordinates of points A and B and computes $l_{A,B}(Q)$ using a result of the computation and xy coordinates of points Q and B, and stores a result of the computation in the memory unit 13.

Next, the electronic computer 10, causing the CPU 11 to function as the second computation unit by means of the pairing computation program, computes rational point pS (Step S5). To be more specific, the electronic computer 10 reads values of rational points obtained in step S2 and step S3 from the memory unit 13 and computes using these values as below and stores the value of pS in the memory unit 13.

$$pS = p^{10}((2\chi-1)S) + 2\chi S$$

Next, the electronic computer 10, causing the CPU 11 to function as the first computation unit by means of the pairing computation program, computes the rational function $f_{2\chi,pS}(Q)$ by means of Miller's algorithm and stores a result of the computation in the memory unit 13. (Step S6).

The electronic computer 10 performs a computation of the rational function $f_{2\chi,S}(Q)$ specifically as shown in FIG. 3. In particular, in step S6, the electronic computer 10 performs computation of $2\chi pS$ as well as computation of the rational function $f_{2\chi,S}(Q)$ and stores a result of the computation in the memory unit 13.

Next, the electronic computer 10, causing the CPU 11 to function as the second computation unit by means of the pairing computation program, reads a value of $2\chi pS$ stored in the memory unit 13, performs computation of rational points $-pS$, $(2\chi-1)pS$, $p^{10}((2\chi-1)pS)$ respectively and stores values of the respective rational points in the memory unit 13 respectively. (Step S7).

Next, the electronic computer 10, causing the CPU 11 to function as the third computation unit by means of the pairing computation program, reads values of the respective rational points obtained in step S7 from the memory unit 13 respectively, computes $l_3$ which is a value at the rational point Q ($x_Q$, $y_Q$) of a straight line passing through rational points $((2\chi-1)$ pS, $-pS)$ and $l_4$ which is a value at the rational point Q($x_Q$, $y_Q$) of a straight line passing through rational points $(p^{10}((2\chi-1)$ pS), $2\chi pS)$ respectively, and stores values of $l_3$ and $l_4$ in the memory unit 13 respectively. (Step S8).

Next, the electronic computer 10, causing the CPU 11 to function as a fourth computation unit by means of the pairing computation program, reads a result of the computation in the first computation unit (values of $f_{2\chi,S}(Q)$ and $f_{2\chi,S}(Q)$) and a result of the computation in the third computation unit (values of $l_1$, $l_2$, and $l_3$, $l_4$) from the memory unit 13, computes $f'_{\chi,S}(Q)$ expressed as below, and stores a result of the computation in the memory unit 13 (Step S9).

[F77]

$$f'_{\chi,S}(Q) = (\{f_{2\chi,S} \cdot l_1^{-1}\}_{10}^{p^{10}} \cdot f_{2\chi,S} \cdot l_2)^p \cdot \{f_{2\chi,pS} \cdot l_3^{-1}\}^{p^{10}} \cdot f_{\chi,pS} \cdot l_4 \quad \text{(Equation 29)}$$

To be more specific, the electronic computer 10 computes as follows.

```
input:      S∈G₁, Q∈G₂, 2χ, p
output:     f=f'_{χ,S}(Q)
procedure:
1.    A←f_{2χ,S}              //T₁←2χS is obtained
2.    T₂←−S
3.    T₃←T₁+T₂
4.    B←g_{T3,T2}
5.    B←A·B⁻¹
6.    B←B∧p¹⁰
7.    f←B·A
8.    T₄←p¹⁰T₃
9.    B←g_{T4,T1}
10.       T₄←T₄+T₁           //T₄←pS is obtained
11.       f←f·B
12.       f←f^p
13.   A←f_{2χ,T4}             //T₁←2χpS is obtained
14.   T₂←−T₄
15.   T₃←T₁+T₂
16.   B←g_{T3,T2}
17.   C←A·B⁻¹
18.   C←C∧p¹⁰
19.   C←C·A
20.   T₄←p¹⁰T₃
21.   B←g_{T4,T1}
22.   C←C·B
23.   f←f·C
24.   Return f.
```

That is, the CPU 11 performs respective computations in the procedure described above using the memory unit 13, obtains $f'_{\chi,S}(Q)$, and stores the value in the memory unit 13. To be more specific, in step 1, the CPU 11 obtains $f_{2\chi,S}$ by means of Miller's algorithm and assigns the result to A and also assigns $2\chi S$ obtained simultaneously to $T_1$. In step 2 and 3, the CPU 11 obtains rational points $-S$ and $(2\chi-1)S$, and assigns the results to $T_2$ and $T_3$ respectively. In step 4, as mentioned above, since in a case where an embedding degree is an even number, $G_{A,B}$ becomes $l_{A,B}$, the CPU 11 obtains $l_1$ which is a value at rational point Q of a straight line passing through rational points $((2_{\chi-1})S, -S)$, and assigns the result to B. In step 5 and 6, the CPU 11 obtains a { } part in ( ) of (Equation 29) and assign the result to B. In step 7, the CPU 11 obtains a product of B and A, and assigns the result to f. In step 8, the CPU 11 obtains rational point $p^{10}((2\chi-1)S)$ and assigns the result to $T_4$. In step 9, the CPU 11 obtains $l_2$ which is a value at rational point Q of a straight line passing through rational points $(p^{10}((2\chi-1)S), 2\chi S)$ and assigns the result to B. In step 10, the CPU 11 obtains pS using relationship in (Equation 11) and assigns the result to $T_4$. In step 11 and 12, the CPU 11 obtains a ( ) part of (Equation 29) and assigns the result to f. In step 13, the CPU 11 obtains $f_{2\chi,pS}$ by means of Miller's algorithm and assigns the result to A, and assigns $2\chi pS$ obtained simultaneously to $T_1$. In step 14 and 15, the CPU 11 obtains rational points $-pS$ and $(2\chi-1)pS$. In step 16, the CPU 11 obtains $l_3$ which is a value at rational point Q of a straight line passing through rational points $((2\chi-1)pS, -pS)$ and assigns the results to B. In step 17 and 18, the CPU 11 obtains a { } part accompanying ( ) in (Equation 29) described above. In step 19, the CPU 11 obtains a product of C and A, and assigns the result to C. In step 20, the CPU 11 obtains rational point $p^{10}((2\chi-1)S)$ and assigns the result to $T_4$. In step 21, the CPU 11 obtains $l_4$ which is a value at rational point Q of a straight line passing through rational points $(p^{10}((2\chi-1)S), 2\chi pS)$ and assigns the result to B. In step 22 and 23, the CPU 11 obtains $f'_{\chi,S}(Q)$ and assigns the result to f.

Next, the electronic computer 10, causing the CPU 11 to function as a fifth computation unit by means of the pairing computation program, reads a value of $f'_{\chi,S}(Q)$ obtained in step S9 from the memory unit 13, performs an exponentiation of the final exponentiation in pairing e(S, Q), and stores a result of the computation in the memory unit 13 (Step S10).

To be more specific, the electronic computer 10 computes as follows and stores f', that is, a value of e(S, Q) in the memory unit 13.

```
1.    f' ← f'∧p⁶ · f'⁻¹
2.    f' ← f'∧p² · f'
3.    a ← (f'⁶)^χ · (f'⁵)∧p⁶
4.    b ← a^p
5.    b ← a·b
6.    compute f'∧p, f'∧p², and f'∧p³
7.    c ← b·(f'∧p)² · f'∧p²
8.    f' ← f'∧p³ · (c⁶)∧χ² ·c·b· (f'∧p ·f')⁹ ·a·f'∧4
9.    Return f'
```

The electronic computer 10 which constitutes an authentication server performs an authentication processing using a result of the pairing computation obtained as mentioned above.

In the present embodiment, an explanation is made in a case where an embedding degree is 12. However, also in a case where the embedding degree is 8 as described in claim 22 to claim 24, it is possible to compute Twisted Xate pairing at high speed by means of the similar algorithm.

An explanation is made in a case where, that is, the embedding degree is 8, and $r(\chi)$ and $t(\chi)$ are given as follows.

$$r(\chi)=9\chi^4+12\chi^3+8\chi^2+4\chi+1$$

$$t(\chi)=-9\chi^3-3\chi^2-2\chi.$$

In this case, representation of integer variable $\chi$ using $p^2$ and $p^3$ with p as a characteristic is as below.

$$p^3=p^2+3\chi+1$$

In this case, $f'_{\chi,S}(Q)$ becomes, using $l_5$ which is a value at a rational point $Q(x_Q, y_Q)$ of a straight line passing through rational points $(3\chi S, S)$, $l_6$ which is a value at the rational point $Q(x_Q, y_Q)$ of a straight line passing through rational points $(p^2(S), (3\chi+1)S)$, $l_7$ which is a value at the rational point $Q(x_Q, y_Q)$ of a straight line passing through rational points $(3\chi p^3 S, p^3 S)$, and $l_8$ which is a value at the rational point $Q(x_Q, y_Q)$ of a straight line passing through rational points $(p^2(p^3 S), (3\chi+1)p^3 S)$, as follows.

[F78]

$$f'_{\chi,S}(Q)=(f_{3\chi,S}(Q)\cdot l_5\cdot l_6)^{p^3}\cdot f^3_{3\chi,p^3S}(Q)\cdot l_7 l_8$$

Figure 4:
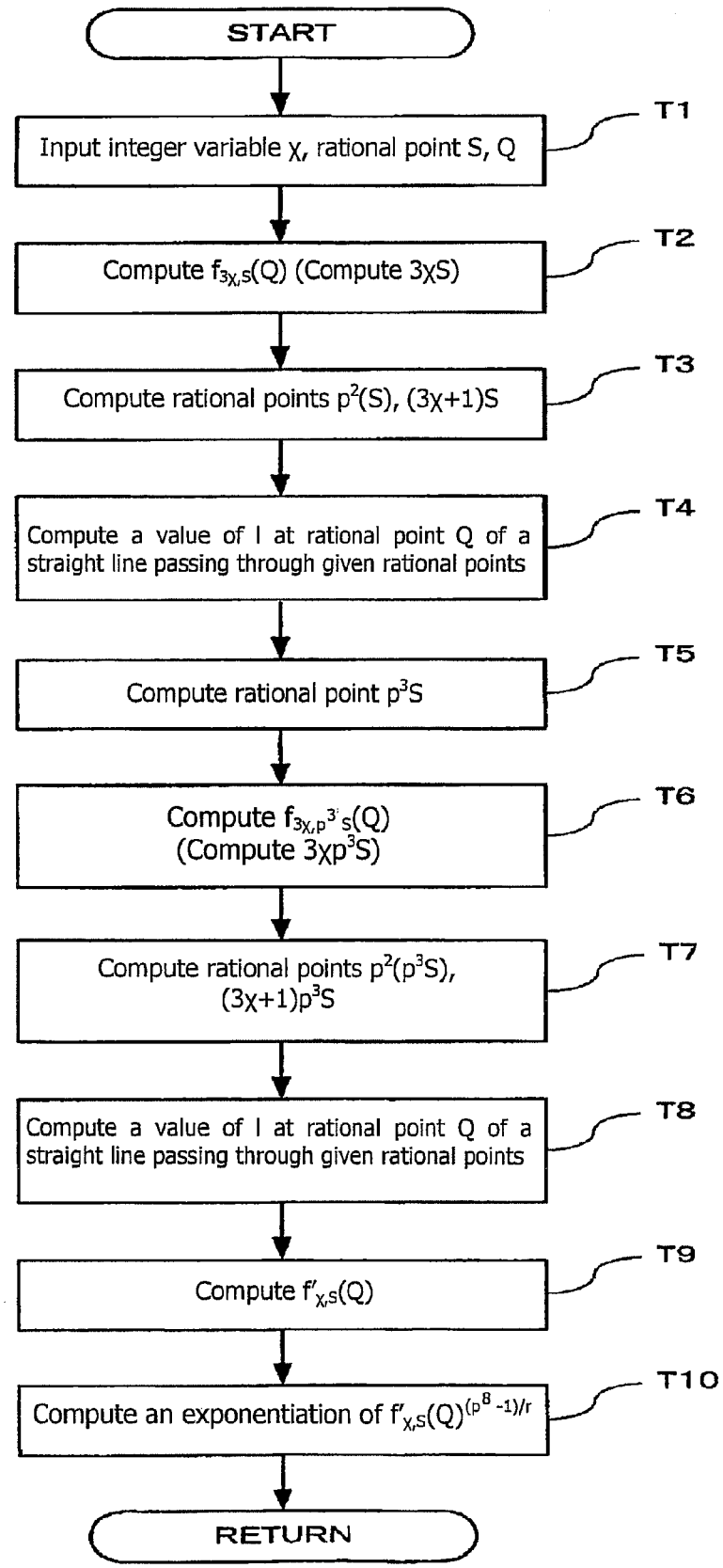
FIG. 4 is a flowchart of the Twisted Xate pairing computation program according to the embodiment of the present invention.

In the similar way as in the case where the embedding degree is 12, in the case where the embedding degree is 8, an authentication server performs pairing computation by means of the started pairing computation program based on a flowchart shown in FIG. 4.

The electronic computer 10, causing the CPU 11 to function as an input unit by means of the started pairing computation program, inputs data of an integer variable $\chi$ and data of rational point S both of which are stored preliminarily in the memory unit 13, and data of rational point Q temporarily stored in the memory unit 13 as signature data into predetermined registers provided inside of the CPU 11 respectively. (Step T1).

Next, the electronic computer 10, causing the CPU 11 to function as a first computation unit by means of the pairing computation program, computes a rational function $f_{3\chi,S}(Q)$ by means of Miller's algorithm and stores a result of the computation in the memory unit 13. (Step T2). In the step T2, the electronic computer 10 performs the same computation processing as in a flowchart shown in FIG. 3, except that anti-logarithm of logarithm to base two instep S21 in the flowchart shown in FIG. 3 is $3\chi$ and the first expression in step S22 is
[F79]

$$\lambda_{T,T} \leftarrow (3x_T^2 + a)/2y_T. \qquad 1.$$

Here, "a" is a coefficient of first degree in an elliptic curve given as $y^2 = x^3 + ax$, $a \in F_p$.

Further, also in the step T2, the electronic computer 10 computes $3\chi S$ as well as the rational function $f_{3\chi,S}(Q)$ and stores results of the computation in the memory unit 13.

After computing rational function $f_{3\chi,S}(Q)$ and $3\chi S$, the electronic computer 10, causing the CPU 11 to function as a second computation unit by means of the pairing computation program, reads a value of $3\chi S$ stored in the memory unit 13, performs computation of rational points $p^2(S)$ and $(3\chi+1)S$ respectively and stores values of the rational points in the memory unit 13 respectively. (Step T3).

Next, the electronic computer 10, causing the CPU 11 to function as a third computation unit by means of the pairing computation program, reads values of the respective rational points obtained in step T3 from the memory unit 13 respectively, computes $l_5$ which is a value at a rational point $Q(x_Q, y_Q)$ of a straight line passing through rational points $(3\chi S, S)$ and $l_6$ which is a value at the rational point $Q(x_Q, y_Q)$ of a straight line passing through rational point $(p^2(S), (3\chi+1)S)$ respectively, and stores values of $l_5$ and $l_6$ in the memory unit 13 respectively. (Step T4).

In the same way as in the case where the embedding degree is 12, to be more specific, the electronic computer 10 computes $l = 1_{A,B}(Q)$ as follows.

$$\lambda_{A,B} \leftarrow (y_B - y_A)/(x_B - x_A),$$

$$l_{A,B}(Q) \leftarrow (x_Q - x_B)\lambda_{A,B} - (y_Q - y_B)$$

Next, the electronic computer 10, causing the CPU 11 to function as the second computation unit by means of the pairing computation program, computes rational point $p^3S$ (Step T5). To be more specific, the electronic computer reads values of rational points obtained in step T2 and step T3 from the memory unit 13, computes as below, and stores the value of $p^3S$ in the memory unit 13.

$$p^3S = p^2S + (3\chi+1)S.$$

Next, the electronic computer 10, causing the CPU 11 to function as the first computation unit by means of the pairing computation program, computes a rational function $f_{3\chi,p^3S}(Q)$ by means of Miller's algorithm and stores a result of the computation in the memory unit 13. (Step T6).

The electronic computer 10 performs a computation of the rational function $f_{3\chi,p^3S}(Q)$ specifically as shown in FIG. 3. In particular, in step T6, the electronic computer 10 performs computation of $3\chi p^3S$ as well as computation of the rational function $f_{3\chi,p^3S}(Q)$ and stores results of the computation in the memory unit 13.

Next, the electronic computer 10, causing the CPU 11 to function as the second computation unit by means of the pairing computation program, reads the value of $3\chi p^3S$ stored in the memory unit 13, performs computation of rational points $p^2(p^3S)$, $(3\chi+1)p^3S$ respectively and stores values of the respective rational points in the memory unit 13 respectively. (Step T7).

Next, the electronic computer 10, causing the CPU 11 to function as the third computation unit by means of the pairing computation program, reads values of respective rational points obtained in step T7 from the memory unit 13 respectively, computes $l_7$ which is a value at the rational point $Q(x_Q, y_Q)$ of a straight line passing through rational points $(3\chi p^3S, p^3S)$ and $l_8$ which is in a value at the rational point $Q(x_Q, y_Q)$ of a straight line passing through rational points $(p^2(p^3S), (3\chi+1)p^3S)$ respectively, and stores values of $l_7$ and $l_8$ in the memory unit 13 respectively. (Step T8).

Next, the electronic computer 10, causing the CPU 11 to function as a fourth computation unit by means of the pairing computation program, reads a result of the computation in the first computation unit (values of $f_{3\chi,S}(Q)$ and $f_{3\chi,p^3S}(Q)$), and a result of the computation in the third computation unit (values of $l_5$, $l_6$, and $l_7$, $l_8$) from the memory unit 13 and computes $f'_{\chi,S}(Q)$ expressed as below and stores a result of the computation in the memory unit 13 (Step T9).
[F80]

$$f'_{\chi,S}(Q) = (f_{3\chi,S}(Q) \cdot l_5 \cdot l_6)^{p^3} \cdot f_{3\chi,p^3S}(Q) \cdot l_7 \cdot l_8 \qquad \text{(Equation 30)}$$

To be more specific, the electronic computer 10 performs computation of $f'_{\chi,S}(Q)$ as follows.

```
input:          S∈G₁, Q∈G₂, 3 χ, p
output:         f=f' χ, S(Q)
procedure:
  1.     A←f_{3χ, S}                   //T₁←3 χ S is obtained
  2.     B←g_{T1, S}
  3.     T₂←T₁+S
  4.     T₃←p²S
  5.     C←g_{T3, T2}
  6.     f←A·B·C
  7.     T₄←T₃+T₂                      //T₄←p³S
  8.     A←f_{3χ, T4}                  ///T₁←3 χ p³S
  9.     B←g_{T1, T4}
 10.     T₂←T₁+T4
 11.     T₃←p²T₄
 12.     C←g_{T3, T2}
 13.     f←f^{p³}·A·B·C
 14.     Return f
```

That is, the CPU 11 performs respective computations of the procedure described above using the memory unit 13, obtains a value of $f'_{\chi,S}(Q)$ and stores the value in the memory unit 13. To be more specific, in step 1, the CPU 11 obtains $f_{3\chi,S}$ by means of Miller's algorithm, assigns the result to A, and also assigns $3\chi S$ obtained simultaneously to $T_1$. In step 2, the CPU 11 obtains $l_5$ which is a value at rational point Q of a straight line passing through rational points $(3\chi S, S)$ and assigns the result to B. In step 3 and step 4, the CPU 11 obtains rational points $(3\chi+1)S$ and $p^2(S)$ and assigns the results to $T_2$ and $T_3$ respectively. In step 5, the CPU 11 obtains $l_6$ which is a value at rational point Q of a straight line passing through rational points $(p^2(S), (3\chi+1)S)$ and assigns the result to C. In step 6, the CPU 11 takes a product of A, B and C, obtains a ( ) part of (Equation 30) described above and assigns the result to f. In step 7, the CPU 11 obtains $p^3S$ using relationship that $p^3 = p^2 + 3\chi + 1$ and assigns the result to $T_4$. In step 8, the CPU 11 obtains $f_{3\chi,p^3S}$ by means of Miller's algorithm and assigns the result to A and also assigns $3\chi p^3S$ obtained simultaneously to $T_1$. In step 9, the CPU 11 obtains $l_7$ which is a value at rational point Q of a straight line passing through rational points $(3\chi p^3S, p^3S)$ and assigns the result to B. In step 10 and step 11, the CPU 11 obtains rational points $(3\chi+1)p^3S$, $p^2(p^3S)$ and assigns the results to $T_2$ and $T_3$ respectively. In step 12, the CPU 11 obtains $l_8$ which is a value at rational point Q of a straight line passing through rational points ($p^2(p^3S)$, $(3\chi+1)p^3S$) and assigns the result to C. In step 13, the CPU 11 obtains $f'_{\chi,S}(Q)$ and assigns the result to f.

Next, the electronic computer 10, causing the CPU 11 to function as a fifth computation unit by means of the pairing computation program, reads a value of $f'_{\chi,S}(Q)$ obtained in step T9 from the memory unit 13, performs an exponentiation of the final exponentiation in pairing e(S, Q) and stores a result of the computation in the memory unit 13. (Step T10).

Figure 5:
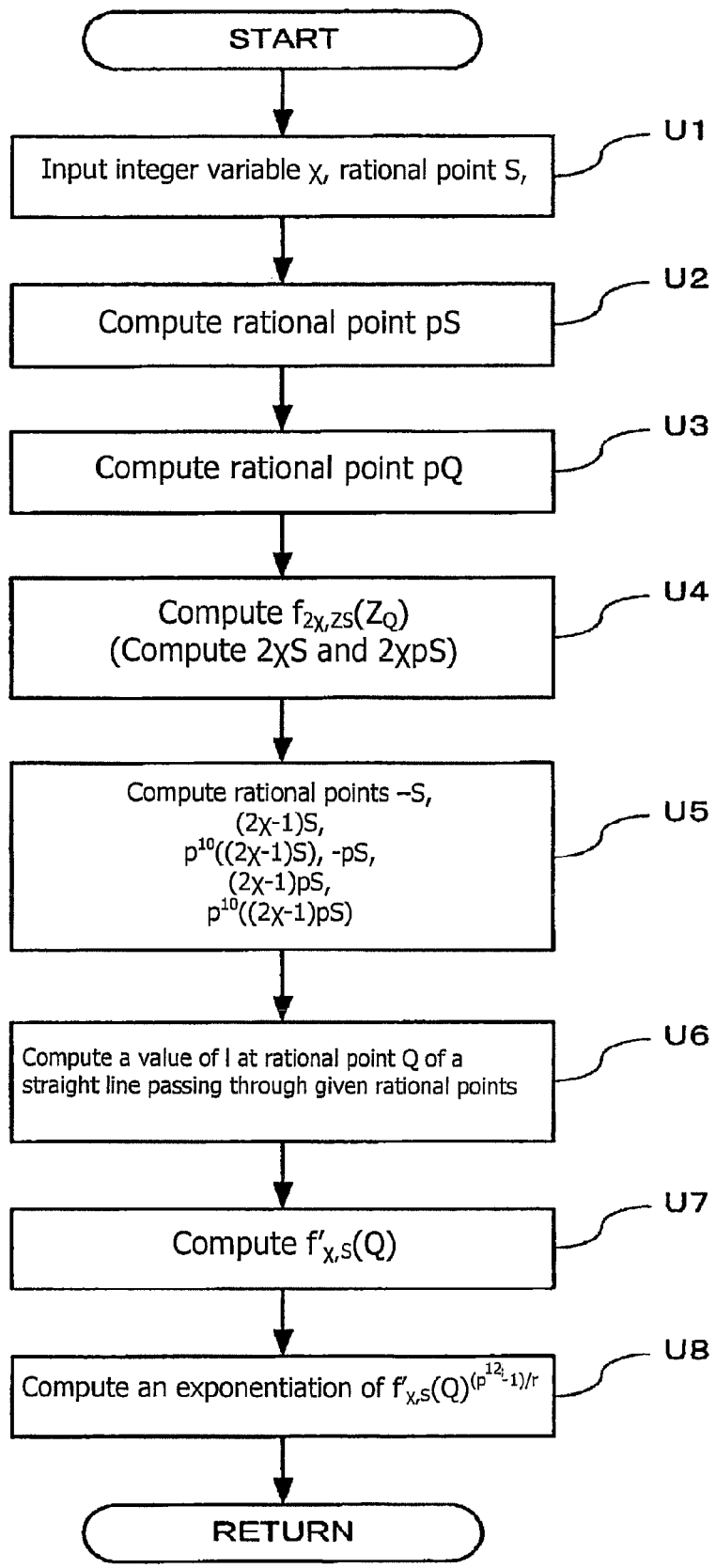
FIG. 5 is a flowchart of the Twisted Xate multi-pairing computation program according to the embodiment of the present invention.

Hereinafter, an embodiment of Twisted Xate multi-pairing in a case where an embedding degree is 12 is explained in detail. Explanation of the parts which are common to Twisted Xate pairing is omitted. Based on FIG. 5, Twisted Xate multi-pairing in a case where the embedding degree is 12 is explained.

The electronic computer 10, causing the CPU 11 to function as an input unit by means of the started pairing computation program, inputs data of an integer variable $\chi$ and data of rational point S both of which are stored preliminarily in the memory unit 13, and data of rational point Q temporarily stored in the memory unit 13 as signature data into predetermined registers provided inside of the CPU 11 respectively. (Step U1).

Next, the electronic computer 10, causing the CPU11 to function as a second computation unit by means of the pairing computation program, performs a computation of rational point pS and stores the value of pS in the memory unit 13 (step U2).

Next, the electronic computer 10, causing the CPU11 to function as the second computation unit by means of the pairing computation program, performs a computation of rational point pQ and stores the value of pQ in the memory unit 13 (step U3).

Next, the electronic computer 10, causing the CPU 11 to function as a first computation unit by means of the pairing computation program, computes a rational function $F_{2\chi,2S}(Z_Q)$ by means of Miller's algorithm with respect to multi-pairing and stores a result of the computation in the memory unit 13. (Step U4).

Figure 6:
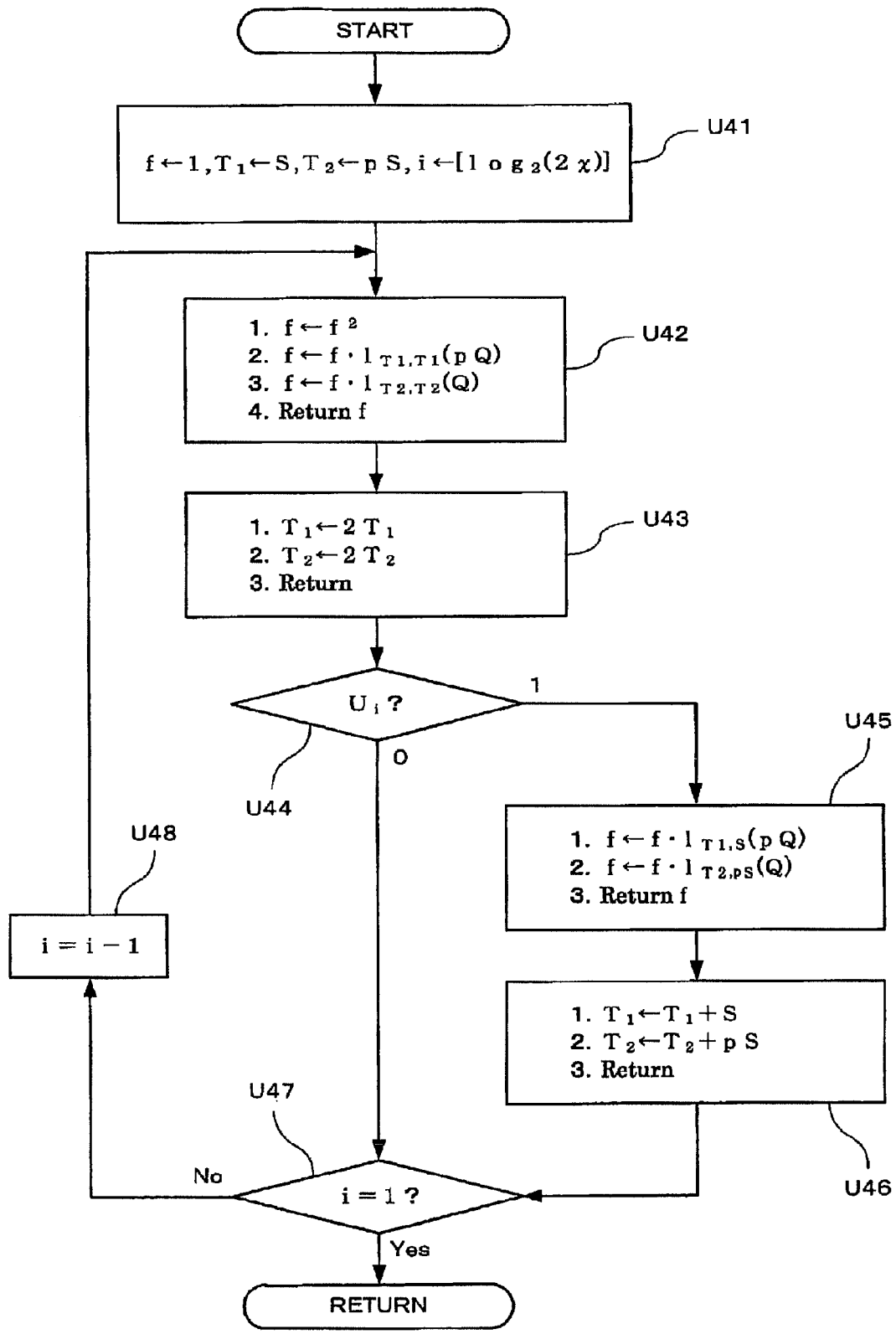
FIG. 6 is a flowchart for computing a rational function $F_{2\chi,ZS}(Z_Q)$.

The electronic computer 10 performs computation of the rational function $F_{2\chi,2S}(Z_Q)$ specifically as shown in FIG. 6. In particular, in Step U4, the electronic computer 10 computes $2\chi S$ and $2\chi pS$ as well as the rational function $F_{2\chi,ZS}(Z_Q)$ and stores results of the computation in the memory unit 13.

That is, firstly, the electronic computer 10, as initial setting, sets f to be 1, $T_1$ to be S, $T_2$ to be pS and also sets the number of bits in a case of binary representation of the integer variable $2\chi$ to be i (Step U41).

Next, the electronic computer 10 performs predetermined computation of the rational function $F_{2\chi,ZS}(Z_Q)$ part in step U42, performs predetermined computation of $2\chi S$ and $2\chi pS$ part in step U43, determines whether $u_i$ which is a value of i-th bit counted from the least degree of the integer variable $2\chi$ is "1" or "0" (Step U44) and, when $u_i=1$, further performs predetermined computation of $F_{2\chi ZS}(Z_Q)$ part in step U45 and predetermined computation of $2\chi S$ and $2\chi pS$ part in step U46.

Next, the electronic computer 10, when i≠1 (Step U47), decrements i (Step U48), returns to Step U42 and, by repeating the processing until i=1 in Step U47, computes the rational function $F_{2\chi,ZS}(Z_Q)$, and $2\chi S$ and $2\chi pS$, and stores results of the computation in the memory unit 13 respectively.

Next, the electronic computer 10, causing the CPU 11 to function as the second computation unit by means of the pairing computation program, reads values of $2\chi S$ and $2\chi pS$ stored in the memory unit 13, performs computation of rational points $-S$, $(2\chi-1)S$, $p^{10}((2\chi-1)S)$, 31 pS, $(2\chi-1)pS$, and $p^{10}((2\chi-1)pS)$ respectively and stores values of the respective rational points in the memory unit 13 respectively. (Step U5).

Next, the electronic computer 10, causing the CPU 11 to function as a third computation unit by means of the pairing computation program, reads values of the respective rational points obtained in step U5 from the memory unit 13 respectively, computes $l_1$ which is a value at a rational point $Q(x_Q, y_Q)$ of a straight line passing through rational points $((2\chi-1)S, -S)$, $l_2$ which is a value at the rational point $Q(x_Q, y_Q)$ of a straight line passing through rational points $((2\chi-1)pS, -pS)$, $l_3$ which is a value at the rational point $Q(x_Q, y_Q)$ of a straight line passing through rational points $(p^{10}((2\chi-1)S), 2\chi S)$ and $l_4$ which is a value at the rational point $Q(x_Q, y_Q)$ of a straight line passing through rational points $(p^{10}((2\chi-1)pS), 2\chi pS)$ respectively, and stores values of $l_1$, $l_2$, $l_3$, and $l_4$ in the memory unit 13 respectively. (Step U6).

To be more specific, the electronic computer 10 computes $l=l_{A,B}(Q)$ as follows.

$$\lambda_{A,B} \leftarrow (y_B - y_A)/(x_B - x_A),$$

$$l_{A,B}(Q) \leftarrow (x_Q - x_B)\lambda_{A,B} - (u_Q - y_B)$$

That is, the CPU 11 computes a gradient $\lambda_{A,B}$ using xy coordinates of points A and B, computes $l_{A,B}(Q)$ using a result of the computation and xy coordinates of the points Q and B, and stores a result of the computation in the memory unit 13.

Next, the electronic computer 10, causing the CPU 11 to function as a fourth computation unit by means of the pairing computation program, reads a result of the computation in the first computation unit (Step U4), and a result of the computation in the third computation unit (values of $l_1$, $l_2$, $l_3$, and $l_4$) from the memory unit 13, computes $f'_{\chi,S}(Q)$ expressed as below, and stores a result of the computation in the memory unit 13 (Step U7).

[F81]

$$f'_{\chi,S}(Q) = \{F_{2\chi,ZS}(Z_Q) \cdot \{l_1{}^p \cdot l_2\}^{-1}\}^{p^{10}} \cdot F_{2\chi,ZS}(Z_Q) \cdot l_3{}^p \cdot l_4 \quad \text{(Equation 31)}$$

Next, the electronic computer 10, causing the CPU 11 to function as a fifth computation unit by means of the pairing computation program, reads a value of $f'_{\chi,S}(Q)$ obtained in step U7 from the memory unit 13, performs an exponentiation of the final exponentiation in pairing e(S, Q), and stores a result of the computation in the memory unit 13 (Step U8).

To be more specific, the electronic computer 10 performs a computation of $f'_{\chi,S}(Q)$ as follows.

```
input :      Z_S={S, pS∈G_1}, Z_Q={pQ, Q∈G_2}, 2 χ, p
output :     f=f' χ, S(Q)
procedure :
1.           A←MMA (2 χ, 2, Z_S, Z_Q )        //T_1←2 χ S, T_2←2 χ pS
2.           T_3← -S
3.           T_4←T_1 +T_3
4.           B←g_{T4, T3}
5.           T_5← -pS
6.           T_6←T_2 +T_5
7.           C←g_{T5, T6}
8.           f←B^p ·C
9.           f←A ·f^{-1}
10.          T_3←p^{10}T_4
11.          B←g_{T3, T1}
12.          T_5←p^{10}T_6
13.          C←g_{T5, T2}
14.          D←B^p ·C
15.          f←f^p^{10} ·A ·D
16.          Return f
```

That is, the CPU 11 performs respective computations of the procedure described above using the memory unit 13, obtains f'$_{\chi,S}$(Q), and stores the value in the memory unit 13.

To be more specific, in step 1, the CPU 11 obtains $F_{2\chi,ZS}$ by means of Miller's algorithm with respect to multi-pairing, assigns the result to A, and also assigns 2χS and 2χpS obtained simultaneously to T$_1$ and T$_2$ respectively. In step 2 and step 3, the CPU 11 obtains rational points −S and (2χ1)S and assigns the result to T$_3$ and T$_4$ respectively. In step 4, the CPU 11 obtains l$_1$ which is a value at rational point Q of a straight line passing through rational points ((2χ−1)S, −S) and assigns the result to B. In step 5 and 6, the CPU 11 obtains rational points −pS and (2χ−1)pS and assign the result to T$_5$ and T$_6$ respectively. In step 7, the CPU 11 obtains l$_2$ which is a value at rational point Q of a straight line passing through rational points (−pS, (2χ−1)pS) and assigns the result to C. In step 8, the CPU 11 takes a product of B to the power of p and C, obtains a {} part of the inside of (Equation 31) described above and assigns the result to f. In step 9, the CPU 11 obtains a {} part of the outside of (Equation 31) described above and assigns the result to f. In step 10, the CPU 11 obtains a value of rational point p$^{10}$((2χ−1)S) and assigns the result to T$_3$. In step 11, the CPU 11 obtains l$_3$ which is a value at rational point Q of a straight line passing through rational points (p$^{10}$((2χ−1)S), 2χS) and assigns the results to B. In step 12, the CPU 11 obtains rational point p$^{10}$((2χ−1)pS) and assigns the result to T$_5$. In step 13, the CPU 11 obtains l$_4$ which is a value at rational point Q of a straight line passing through rational points (p$^{10}$((2χ−1)pS), 2χpS) and assigns the result to C. In step 14, the CPU 11 obtains a product of B to the power of p and C. In step 15, the CPU 11 obtains the whole of (Equation 31) described above and assigns the result (f'$_{\chi,S}$(Q)) to f.

Figure 7:
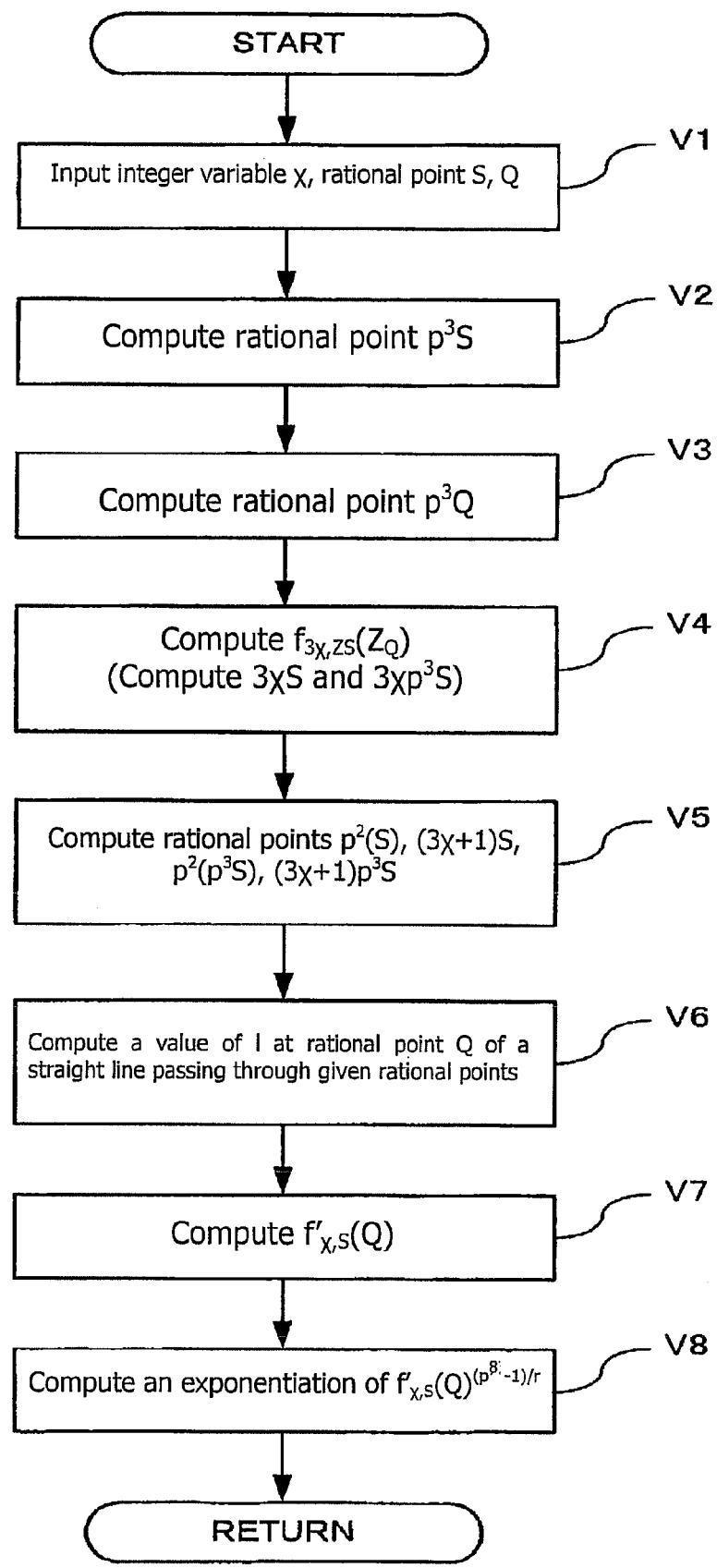
FIG. 7 is a flowchart of a Twisted Xate multi-pairing computation program according to the embodiment of the present invention.

In the embodiment, Twisted Xate multi-pairing in the case where the embedding degree is 12 is explained. However, it is possible to compute Twisted Xate multi-pairing at high speed also in a case where the embedding degree is 8 by means of the similar algorithm. Explanation of the parts which are common to Twisted Xate pairing is omitted. Computation of multi-pairing in the case where the embedding degree is 8 is explained with reference to FIG. 7.

The electronic computer 10, causing the CPU 11 to function as an input unit by means of the started pairing computation program, inputs data of an integer variable χ and data of rational point S both of which are stored preliminarily in the memory unit 13, and data of rational point Q temporarily stored in the memory unit 13 as signature data into predetermined registers provided inside of the CPU 11 respectively. (Step V1).

Next, the electronic computer 10, causing the CPU 11 to function as a second computation unit by means of the pairing computation program, performs a computation of rational point p$^3$S and stores the value of p$^3$S in the memory unit 13 (step V2).

Next, the electronic computer 10, causing the CPU 11 to function as the second computation unit by means of the pairing computation program, performs a computation of rational point p$^3$Q and stores the value of p$^3$Q in the memory unit 13 (step V3).

Next, the electronic computer 10, causing the CPU 11 to function as a first computation unit by means of the pairing computation program, computes a rational function $F_{3\chi,ZS}$(Z$_Q$) by means of Miller's algorithm with respect to multi-pairing and stores a result of the computation in the memory unit 13. (Step V4). In this Step V4, the electronic computer 10 performs the same computation processing as a flowchart shown in FIG. 6 except that anti-logarithm of logarithm to base two is 3χ, and all p become p$^3$.

Also in step V4, the electronic computer 10 computes 3χS and 3χp$^3$S as well as the rational function $F_{3\chi,ZS}$(Z$_Q$) and stores results of the computation in the memory unit 13.

After computing the rational function $F_{3\chi,ZS}$(Z$_Q$), and 3χS and 3χp$^3$S, the electronic computer 10, causing the CPU 11 to function as the second computation unit by means of the pairing computation program, reads values of 3χS and 3χp$^3$S stored in the memory unit 13, performs computation of rational points p$^2$(S), (3χ+1)S, p$^2$(p$^3$S), and (3χ+1)p$^3$S respectively and stores values of the respective rational points in the memory unit 13 respectively. (Step V5).

Next, the electronic computer 10, causing the CPU 11 to function as a third computation unit by means of the pairing computation program, reads values of the respective rational points obtained in step V5 from the memory unit 13 respectively, computes l$_5$ which is a value at a rational point Q(x$_Q$, y$_Q$) of a straight line passing through rational points (3χS, S), l$_6$ which is a value at the rational point Q (x$_Q$, y$_Q$) of a straight line passing through rational points (p$^2$(S), (3χ+1)S), l$_7$ which is a value at the rational point Q (x$_Q$, y$_Q$) of a straight line passing through rational points (3χp$^3$S, p$^3$S) and l$_8$ which is a value at the rational point Q (x$_Q$, y$_Q$) of a straight line passing through rational points (p$^2$(p$^3$S), (3χ+1)p$^3$S) respectively, and stores values of l$_5$, l$_6$, l$_7$, and l$_8$ in the memory unit 13 respectively. (Step V6).

To be more specific, in the same way as in the case where the embedding degree is 12, the electronic computer 10 computes l=l$_{A,B}$(Q) as follows.

$$\lambda^{A,B} \leftarrow (y_B - y_A)/(x_B - X_A),$$

$$l_{A,B}(Q) \leftarrow (x_Q - x_B)\lambda_{A,B} - (y_Q - y_B)$$

Next, the electronic computer 10, causing the CPU 11 to function as a fourth computation unit by means of the pairing computation program, reads a result of the computation in the first computation unit, and a result of the computation in the third computation unit (values of l$_5$, l$_6$, l$_7$, and l$_8$) from the memory unit 13 and computes f'$_{\chi,S}$(Q) expressed as below and stores a result of the computation in the memory unit 13 (Step V7).

[F82]

$$f'_{\chi,S}(Q) = F_{3\chi,ZS} \cdot \{l_5 \cdot l_6\}^{p^5} \cdot l_7 \cdot l_8 \quad \text{(Equation 32)}$$

To be more specific, the electric computer 10 performs the computation of f'$_{\chi,S}$(Q) as follows.

```
input :      Z_S={S, p³S∈G₁}, Z_Q={p³Q, Q∈G₂}, 3 χ, p
output :     f=f' χ, S(Q)
procedure :
 1.          A←MMA (3 χ, 2, Z_S, Z_Q )         //T₁←3 χ S, T₂←3 χ p³S
 2.          B←g_{3χS, S}
 3.          T₃←T₁+S
 4.          T₄←p²S
 5.          C← g_{T4, T3}
 6.          f←B ·C
 7.          f←f^p³
 8.          f←A ·f
 9.          B←g_{T2,pΛ3S}
10.          T₃←T₂+p³S
11.          T4←p²p³S
12.          C←g_{T4, T3}
13.          f←f· B ·C
14.          Return f
```

That is, the CPU 11 performs respective computations of the procedure described above using the memory unit 13, obtains $f'_{\chi,S}(Q)$, and stores the value in the memory unit 13. To be more specific, In step 1, the CPU 11 obtains $F_{3\chi,ZS}$ by means of Miller's algorithm with respect to multi-pairing and assigns the result to A and also assigns $3\chi S$ and $3\chi p^3 S$ obtained simultaneously to $T_1$ and $T_2$ respectively. In step 2, the CPU 11 obtains $l_5$ which is a value at rational point Q of a straight line passing through rational points $(3\chi S, S)$ and assigns the result to B. In step 3 and step 4, the CPU 11 obtains rational points $(3\chi+1)S$ and $p^2(S)$ and assigns the result to $T_3$ and $T_4$ respectively. In step 5, the CPU 11 obtains $l_6$ which is a value at rational point Q of a straight line passing through rational points $(p^2(S), (3\chi+1)S)$ and assigns the result to C. In step 6, the CPU 11 takes a product of B and C, obtains an inside of { } part of (Equation 32) described above and assigns the result to f. In step 7, the CPU 11 obtains a {} part of (Equation 32) described above. In step 8, the CPU 11 obtains a result up to the {} part of (Equation 32) described above and assign the result to f. In step 9, the CPU 11 obtains $l_7$ which is a value at rational point Q of a straight line passing through rational points $(3\chi p^3 S, p^3 S)$ and assigns the result to B. In step 10 and step 11, the CPU 11 obtains rational points $(3\chi+1)p^3 S$ and $p^2(p^3 S)$, and assigns the results to $T_3$ and $T_4$ respectively. In step 12, the CPU 11 obtains $l_8$ which is a value at rational point Q of a straight line passing through rational points $(p^2(p^3 S), (3\chi+1)p^3 S)$ and assigns the result to C. In step 13, the CPU 11 obtains $f'_{\chi,S}(Q)$, and assigns the result to f.

Next, the electronic computer 10, causing the CPU 11 to function as a fifth computation unit by means of the pairing computation program, reads the value of $f'_{\chi,S}(Q)$ obtained in step V7, performs an exponentiation of the final exponentiation in pairing $e(S, Q)$, and stores a result of the computation in the memory unit 13 (Step V8).

In addition, in the explanation made above, the memory unit 13 is used as storage means for storing each computation result. However, registers provided with inside of the CPU 11 may be used as the storage means described above.

EXPLANATION OF SYMBOLS

10 electronic computer
11 CPU
12 storage unit
13 memory unit
14 bus
15 input output control part
20 telecommunication line
30 client device

What is claimed is:

1. A pairing computation device, wherein an elliptic curve is given as $y^2=x^3+ax+b$, $a \in F_p$, $b \in F_p$, letting k be an embedding degree, E be an additive group constituted of rational points on the pairing enabled elliptic curve defined over an extension field $F_p^k$, E[r] be a set of rational points having a prime order r, and $\phi_p$ be a Frobenius endomorphism, a pairing e is defined using $$G_1 = E[r] \cap \text{Ker}(\phi_p - [1]),$$

$$G_2 = E[r] \cap \text{Ker}(\phi_p - [p]),$$

as a non-degenerate bilinear map $$e: G_1 \times G_2 \to F_p^{*k}/(F_p^{*k})^r,$$

the pairing computation device comprising a CPU which computes the pairing $e(S,Q)$, by letting $S \in G_1$, $Q \in G_2$, $\chi$ be a given integer variable, and F be a rational function which is calculated using Miller's algorithm with respect to multi-pairing (MMA), wherein the order r and a trace t of the Frobenius endomorphism $\phi_p$ are specified preliminarily according to the embedding degree k using the integer variable $\chi$, and the CPU includes:

an input unit which inputs the integer variable $\chi$, the rational point S, and the rational point Q into respective predetermined registers;

a computation unit which computes F;

a computation unit which computes a value of a straight line passing through given rational points at a rational point Q $(x_Q, y_Q)$;

a computation unit which computes $f'_{\chi,S}(Q)$ using said F and said value ; and a computation unit which computes the pairing $e(S,Q)$ using said $f'_{\chi,S}(Q)$ as

[F1]

$$e(S,Q) = f'_{\chi,S}(Q)^{(p^k-1)/r}.$$

2. A pairing computation method, wherein an elliptic curve is given as $y^2=x^3+ax+b$, $a \in F_p$, $b \in F_p$, letting k be an embedding degree, E be an additive group constituted of rational points on the pairing enabled elliptic curve defined over an extension field $F_p^k$, E[r] be a set of rational points having a prime order r, and $\phi_p$ be a Frobenius endomorphism, a pairing e is defined using $$G_1 = E[r] \cap \text{Ker}(\phi_p - [1]),$$

$$G_2 = E[r] \cap \text{Ker}(\phi_p - [p]),$$

as non-degenerate bilinear map $$e: G_1 \times G_2 \to F_p^{*k}/(F_p^{*k})^r,$$

an electronic computer which includes a CPU computes the pairing $e(S,Q)$, by letting $S \in G_1$, $Q \in G_2$, $\chi$ be a given integer variable, and F be a rational function which is calculated using Miller's algorithm with respect to multi-pairing (MMA), the order r and a trace t of the Frobenius endomorphism $\phi_p$ being specified preliminarily according to the embedding degree k using the integer variable $\chi$, the pairing computation method comprising:

a step of inputting the integer variable $\chi$, the rational point S, and the rational point Q into respective predetermined registers by causing the CPU of the electronic computer to function as an input unit;

a step of computing F by causing the CPU of the electronic computer to function as a computation unit;

a step of computing a value of a straight line passing through given rational points at a rational point Q($x_Q$, $y_Q$) by causing the CPU of the electronic computer to function as a computation unit;

a step of computing $f'_{\chi,S}(Q)$ using said F and said value by causing the CPU of the electronic computer to function as a computation unit; and a step of computing the pairing $e(S,Q)$ using said $f'_{\chi,S}(Q)$ as

[F2]

$$e(S,Q) = f'_{\chi,S}(Q)^{(p^k-1)/r}$$

by causing the CPU of the electronic computer to function as a computation unit.

3. A non-transitory computer recording medium storing a pairing computation program, wherein an elliptic curve is given as $y^2=x^3+ax+b$, $a \in F_p$, $b \in F_p$, letting k be an embedding degree, E be an additive group constituted of rational points on the pairing enabled elliptic curve defined over an extension field $F_p^k$, E[r] be a set of rational points having a prime order r, and $\phi_p$ be a Frobenius endomorphism, a pairing e is defined using $$G_1 = E[r] \cap \mathrm{Ker}(\phi_p - [1]),$$

$$G_2 = E[r] \cap \mathrm{Ker}(\phi_p - [p]),$$

as non-degenerate bilinear map $$e: G_1 \times G_2 \to F_p^{*k}/(F_p^{*k})^r,$$

the pairing computation program causes an electronic computer which includes a CPU to compute the pairing e(S,Q), by letting S∈$G_1$, Q∈$G_2$, χ be a given integer variable, and F be a rational function which is calculated using Miller's algorithm with respect to multi-pairing (MMA), the order r and a trace t of the Frobenius endomorphism $\phi_p$ being specified preliminarily according to the embedding degree k using the integer variable χ, the pairing computation program causing the CPU of the electronic computer to function as:

an input unit which inputs the integer variable χ, the rational point S, and the rational point Q into respective predetermined registers;

a computation unit which computes F;

a computation unit which computes a value of a straight line passing through given rational points at a rational point Q($x_Q$, $y_Q$);

a computation unit which computes f'$_{χ}^{S}$(Q) using said F and said value; and a computation unit which computes the pairing e(S,Q) using said f'$_{χ}^{S}$(Q) as

[F3]

$$e(S,Q) = f'^S_\chi(Q)^{(p^k-1)/r}.$$

4. A pairing computation device, wherein an elliptic curve is given as $y^2 = x^3 + b$, b∈$F_p$, letting an embedding degree be 12, E be an additive group constituted of rational points on the pairing enabled elliptic curve defined over an extension field $F_p^{12}$, E[r] be a set of rational points having a prime order r, and $\phi_p$ be a Frobenius endomorphism, a pairing e is defined using $$G_1 = E[r] \cap \mathrm{Ker}(\phi_p - [1]),$$

$$G_2 = E[r] \cap \mathrm{Ker}(\phi_p - [p]),$$

as a non-degenerate bilinear map $$e: G_1 \times G_2 \to F_p^{*12}/(F_p^{*12})^r,$$

the pairing computation device comprising a CPU which computes the pairing e(S,Q), by letting S∈$G_1$, Q∈$G_2$, χ be a given integer variable, $Z_S$ be a set of rational points S and pS, $Z_Q$ be a set of rational points pQ and Q, and $F_{2\chi,ZS}(Z_Q)$ be a rational function which is calculated using Miller's algorithm with respect to multi-pairing (MMA), wherein the order r and a trace t of the Frobenius endomorphism $\phi_p$ are specified using the integer variable χ as, $$r(\chi) = 36\chi^4 - 36\chi^3 + 18\chi^2 - 6\chi + 1,$$

$$t(\chi) = 6\chi^2 + 1,$$

and a representation of the integer variable χ using $p^{10}$ with p as a characteristic is $$p \equiv (2\chi - 1)p^{10} + 2\chi(\mathrm{mod}\, r(\chi))\ \mathrm{and}$$

the CPU includes:

an input unit which inputs the integer variable χ, the rational point S, and the rational point Q into respective predetermined registers;

a first computation unit which computes $F_{2\chi,ZS}(Z_Q)$;

a second computation unit which computes given rational points using 2χS and 2χpS which are calculated when computing said $F_{2\chi,ZS}(Z_Q)$;

a third computation unit which computes a value at a rational point Q($x_Q$, $y_Q$) of a straight line passing through the given rational points;

a fourth computation unit which computes f'$_{χ}^{S}$(Q) using said $F_{2\chi,ZS}(Z_Q)$ and said value; and a fifth computation unit which computes the pairing e(S,Q) using said f'$_{χ}^{S}$(Q) as

[F4]

$$e(S,Q) = f'^S_\chi(Q)^{(p^{12}-1)/r}.$$

5. The pairing computation device according to claim 4, wherein the second computation unit computes respective rational points −S, (2$_χ$−1)S, $p^{10}$((2$_χ$−1)S), −pS, (2$_χ$−1)pS, $p^{10}$((2$_χ$−1)pS) in order using previously obtained results, the third computation unit respectively computes a value $l_1$ at a rational point Q($x_Q$, $y_Q$) of a straight line passing through rational points ((2$_χ$−1)S, −S), a value $l_2$ at the rational point Q($x_Q$, $y_Q$) of a straight line passing through rational points ((2$_χ$−1)pS, −pS), a value $l_3$ at the rational point Q($x_Q$, $y_Q$) of a straight line passing through rational points ($p^{10}$((2$_χ$−1)S), 2$_χ$S), and a value $l_4$ at the rational point Q($x_Q$, $y_Q$) of a straight line passing through rational points ($p^{10}$((2$_χ$−1)pS), 2$_χ$pS), and the fourth computation unit computes f'$_{χ}^{S}$(Q) as

[F5]

$$f'^S_\chi(Q) = \{F_{2\chi,ZS}(Z_Q) \cdot \{l_1^p \cdot l_2\}^{-1}\}^{p^{10}} \cdot F_{2\chi,ZS}(Z_Q) \cdot l_3^p \cdot l_4.$$

6. A pairing computation method, wherein an elliptic curve is given as $y^2 = x^3 + b$, b∈$F_p$, letting an embedding degree be 12, E be an additive group constituted of rational points on the pairing enabled elliptic curve defined over an extension field $F_p^{12}$, E[r] be a set of rational points having a prime order r, and $\phi_p$ be a Frobenius endomorphism, a pairing e is defined using $$G_1 = E[r] \cap \mathrm{Ker}(\phi_p - [1]),$$

$$G_2 = E[r] \cap \mathrm{Ker}(\phi_p - [p]),$$

as a non-degenerate bilinear map $$e: G_1 \times G_2 \to F_p^{*12}/(F_p^{*12})^r,$$

an electronic computer which includes a CPU computes the pairing e(S,Q), by letting S∈$G_1$, Q∈$G_2$, χ be a given integer variable, $Z_S$ be a set of rational points S and pS, $Z_Q$ be a set of rational points pQ and Q, and $F_{2\chi,ZS}(Z_Q)$ be a rational function which is calculated using Miller's algorithm with respect to multi-pairing (MMA), the order r and a trace t of the Frobenius endomorphism $\phi_p$ being specified using the integer variable χ as, $$r(\chi) = 36\chi^4 - 36\chi^3 + 18\chi^2 - 6\chi + 1$$

$$t(\chi) = 6\chi^2 + 1,$$

and a representation of the integer variable χ using $p^{10}$ with p as a characteristic being $$p \equiv (2\chi - 1)p^{10} + 2\chi(\mathrm{mod}\, r(\chi)),$$

the pairing computation method comprising:

an input step which inputs the integer variable χ, the rational point S, and the rational point Q into respective predetermined registers by causing the CPU of the electronic computer to function as an input unit;

a first computation step which computes $F_{2\chi,ZS}(Z_Q)$ by causing the CPU of the electronic computer to function as a first computation unit;

a second computation step which computes given rational points using 2χS and 2χpS which are calculated when computing said $F_{2\chi,ZS}(Z_Q)$ by causing the CPU of the electronic computer to function as a second computation unit;

a third computation step which computes a value at a rational point $Q(x_Q, y_Q)$ of a straight line passing through the given rational points by causing the CPU of the electronic computer to function as a third computation unit;

a fourth computation step which computes $f'_{\chi,}{}^S(Q)$ using said $F_{2\chi,ZS}(Z_Q)$ and said value by causing the CPU of the electronic computer to function as a fourth computation unit ; and a fifth computation step which computes the pairing $e(S,Q)$ using said $f'_{\chi,}{}^S(Q)$ as

[F6]

$$e(S,Q)=f'_{\chi,}{}^S(Q)^{(p^{12}-1)/r},$$

by causing the CPU of the electronic computer to function as a fifth computation unit.

7. The pairing computation method according to claim 6, wherein the second computation step computes respective rational points $-S$, $(2_\chi-1)S$, $p^{10}((2_\chi-1)S)$, $-pS$, $(2_\chi-1)pS$, $p^{10}((2_\chi-1)pS)$ in order using previously obtained results, the third computation step respectively computes a value $l_1$ at a rational point $Q(x_Q, y_Q)$ of a straight line passing through rational points $((2_\chi-1)S, -S)$, a value $l_2$ at the rational point $Q(x_Q, y_Q)$ of a straight line passing through rational points $((2_\chi-1)pS, -pS)$, a value $l_3$ at the rational point $Q(x_Q, y_Q)$ of a straight line passing through rational points $(p^{10}((2_\chi-1)S), 2_\chi S)$, and a value $l_4$ at the rational point $Q(x_Q, y_Q)$ of a straight line passing through rational points $(p^{10}((2_\chi-1)pS), 2_\chi pS)$, and the fourth computation step computes $f'_{\chi,}{}^S(Q)$ as

[F7]

$$f'_{\chi,}{}^S(Q)=\{F_{2\chi,ZS}(Z_Q)\cdot\{l_1{}^p\cdot l_2\}^{-1}\}^{p^{10}}\cdot F_{2\chi,ZS}(Z_Q)\cdot l_3{}^p\cdot l_4.$$

8. A non-transitory computer recording medium storing a pairing computation program, wherein an elliptic curve is given as $y^2=x^3+b$, $b\in F_p$, letting an embedding degree be 12, E be an additive group constituted of rational points on the pairing enabled elliptic curve defined over an extension field $F_p{}^{12}$, $E[r]$ be a set of rational points having a prime order r, and $\phi_p$ be a Frobenius endomorphism, a pairing e is defined using $$G_1=E[r]\cap\text{Ker}(\phi_p-[1]),$$

$$G_2=E[r]\cap\text{Ker}(\phi_p-[p]),$$

as a non-degenerate bilinear map $$e:G_1\times G_2\to F^*_p{}^{12}/(F^*_p{}^{12})^r,$$

the pairing computation program causes an electronic computer which includes a CPU to compute the pairing $e(S,Q)$, by letting $S\in G_1$, $Q\in G_2$, $\chi$ be a given integer variable, $Z_S$ be a set of rational points S and pS, $Z_Q$ be a set of rational points pQ and Q, and $F_{2\chi,ZS}(Z_Q)$ be a rational function which is calculated using Miller's algorithm with respect to multi-pairing (MMA), the order r and a trace t of the Frobenius endomorphism $\phi_p$ being specified using the integer variable $\chi$ as, $$r(\chi)=36\chi^4-36\chi^3+18\chi^2-6\chi+1,$$

$$t(\chi)=6\chi^2+1,$$

and a representation of the integer variable $\chi$ using $p^{10}$ with p as a characteristic being $$p=(2_\chi-1)p^{10}+2_\chi(\text{mod}\,r(\chi)),$$

the pairing computation program causing the CPU of the electronic computer to function as:

an input unit which inputs the integer variable $\chi$, the rational point S, and the rational point Q into respective predetermined registers;

a first computation unit which computes $F_{2\chi,ZS}(Z_Q)$;

a second computation unit which computes given rational points using $2_\chi S$ and $2_\chi pS$ which are calculated when computing said $F_{2\chi,ZS}(Z_Q)$;

a third computation unit which computes a value at a rational point $Q(x_Q, y_Q)$ of a straight line passing through the given rational points;

a fourth computation unit which computes $f'_{\chi,}{}^S(Q)$ using said $F_{2\chi,ZS}(Z_Q)$ and said value; and a fifth computation unit which computes the pairing $e(S,Q)$ using said $f'_{\chi,}{}^S(Q)$ as

[F8]

$$e(S,Q)=f'_{\chi,}{}^S(Q)^{(p^{12}-1)/r}.$$

9. The non-transitory computer recording medium storing a pairing computation program according to claim 8, wherein the pairing computation program causes:

the CPU of the electronic computer which functions as the second computation unit to compute respective rational points $-S$, $(2_\chi-1)S$, $p^{10}((2_\chi-1)S)$, $-pS$, $(2_\chi-1)pS$, $p^{10}((2_\chi-1)pS)$ in order using previously obtained results;

the CPU of the electronic computer which functions as the third computation unit to compute respectively a value $l_1$ at a rational point $Q(x_Q, y_Q)$ of a straight line passing through rational points $((2_\chi-1)S, -S)$, a value $l_2$ at the rational point $Q(x_Q, y_Q)$ of a straight line passing through rational points $((2_\chi-1)pS, -pS)$, a value $l_3$ at the rational point $Q(x_Q, y_Q)$ of a straight line passing through rational points $(p^{10}((2_\chi-1)S), 2_\chi S)$, and a value $l_4$ at the rational point $Q(x_Q, y_Q)$ of a straight line passing through rational points $(p^{10}((2_\chi-1)pS), 2_\chi pS)$; and the CPU of the electronic computer which functions as the fourth computation unit to compute $f'_{\chi,}{}^S(Q)$ as

[F9]

$$f'_{\chi,}{}^S(Q)=\{F_{2\chi,ZS}(Z_Q)\cdot\{l_1{}^p\cdot l_2\}^{-1}\}^{p^{10}}\cdot F_{2\chi,ZS}(Z_Q)\cdot l_3{}^p\cdot l_4.$$

10. A pairing computation device, wherein an elliptic curve is given as $y^2=x^3+ax$, $a\in F_p$, letting an embedding degree be 8, E be an additive group constituted of rational points on the pairing enabled elliptic curve defined over an extension field $F_p{}^8$, $E[r]$ be a set of rational points having a prime order r, and $\phi_p$ be a Frobenius endomorphism, a pairing e is defined using $$G_1=E[r]\cap\text{Ker}(\phi_p-[1]),$$

$$G_2=E[r]\cap\text{Ker}(\phi_p-[p]),$$

as a non-degenerate bilinear map $$e:G_1\times G_2\to F^*_p{}^8/(F^*_p{}^8)^r,$$

the pairing computation device comprising a CPU which computes the pairing $e(S,Q)$, by letting $S\in G_1$, $Q\in G_2$, $\chi$ be a given integer variable, $Z_S$ be a set of rational points S and $p^3 S$, $Z_Q$ be a set of rational points $p^3 Q$ and Q, and $F_{3\chi,ZS}(Z_Q)$ be a rational function which is calculated using Miller's algorithm with respect to multi-pairing (MMA), wherein the order r and a trace t of the Frobenius endomorphism $\phi_p$ are specified using the integer variable $\chi$ as, $$r(\chi)=9\chi^4+12\chi^3+8\chi^2+4\chi+1,$$

$$t(\chi)=9\chi^3-3\chi^2-2\chi,$$

and a representation of the integer variable $\chi$ using $p^2$ and $p^3$ with p as a characteristic is $$p^3 \equiv p^2+3\chi+1 (\bmod r(\chi)) \text{ and}$$

the CPU includes:

an input unit which inputs the integer variable $\chi$, the rational point S, and the rational point Q into respective predetermined registers;

a first computation unit which computes $F_{3\chi,ZS}(Z_Q)$;

a second computation unit which computes respective rational points $p^2(S)$, $p^2(p^3S)$, $(3\chi+1)S$, $(3\chi+1)p^3S$ in order using previously obtained results;

a third computation unit which respectively computes a value $l_5$ at a rational point Q $(x_Q, y_Q)$ of a straight line passing through rational points $(3\chi S, S)$, a value $l_6$ at the rational point Q $(x_Q, y_Q)$ of a straight line passing through rational points $(p^2(S), (3\chi+1)S)$, a value $l_7$ at the rational point Q $(x_Q, y_Q)$ of a straight line passing through rational points $(3\chi p^3 S, p^3 S)$, and a value $l_8$ at the rational point Q $(x_Q, y_Q)$ of a straight line passing through rational points $(p^2(p^3S), (3\chi+1)p^3S)$; and the fourth computation unit which computes $f'_{\chi,}{}^S(Q)$ using a computation result of the first computation unit and a computation result of the third computation unit as

[F10]

$$f'_{\chi,}{}^S(Q) = F_{3\chi,ZS}(Z_Q)\{l_5 \cdot l_6\}^{p^3} \cdot l_7 \cdot l_8; \text{ and}$$

a fifth computation unit which computes the pairing e(S,Q) using said $f'_{\chi,}{}^S(Q)$ as

[F11]

$$e(S,Q) = f'_{\chi,}{}^S(Q)^{(p^3-1)/r}.$$

11. A pairing computation method, wherein an elliptic curve is given as $y^2=x^3+ax$, $a\in F_p$, letting an embedding degree be 8, E be an additive group constituted of rational points on the pairing enabled elliptic curve defined over an extension field $F_p{}^8$, E[r] be a set of rational points having a prime order r, and $\phi_p$ be a Frobenius endomorphism, a pairing e is defined using $$G_1 = E[r] \cap \text{Ker}(\phi_p - [1]),$$

$$G_2 = E[r] \cap \text{Ker}(\phi_p - [p]),$$

as a non-degenerate bilinear map $$e: G_1 \times G_2 \rightarrow F^*_p{}^8/(F^*_p{}^8)^r,$$

an electronic computer which includes a CPU computes the pairing e(S,Q), by letting $S \in G_1$, $Q \in G_2$, $\chi$ be a given integer variable, $Z_S$ be a set of rational points S and $p^3S$, $Z_Q$ be a set of rational points $p^3Q$ and Q, and $F_{3\chi,ZS}(Z_Q)$ be a rational function which is calculated using Miller's algorithm with respect to multi-pairing (MMA), the order r and a trace t of the Frobenius endomorphism $\phi_p$ being specified using the integer variable $\chi$ as, $$r(\chi)=9\chi^4+12\chi^3+8\chi^2+4\chi+1,$$

$$t(\chi)=-9\chi^3-3\chi^2-2\chi,$$

and a representation of the integer variable $\chi$ using $p^2$ and $p^3$ with p as a characteristic being $$p^3 \equiv p^2+3\chi+1 (\bmod r(\chi))$$

the pairing computation method comprising:

an input step which inputs the integer variable $\chi$, the rational point S, and the rational point Q into respective predetermined registers by causing the CPU of the electronic computer to function as an input unit;

a first computation step which computes $F_{3\chi,ZS}(Z_Q)$ by causing the CPU of the electronic computer to function as a first computation unit;

a second computation step which computes respective rational points $p^2(S)$, $p^2(p^3S)$, $(3\chi+1)S$, $(3\chi+1)p^3S$ in order using previously obtained results by causing the CPU of the electronic computer to function as a second computation unit;

a third computation step which respectively computes a value $l_5$ at a rational point Q$(x_Q, y_Q)$ of a straight line passing through rational points $(3\chi S, S)$, a value $l_6$ at the rational point Q$(x_Q, y_Q)$ of a straight line passing through rational points $(p^2(S), (3\chi+1)S)$, a value $l_7$ at the rational point Q$(x_Q, y_Q)$ of a straight line passing through rational points $(3\chi p^3 S, p^3 S)$, and a value $l_8$ at the rational point Q$(x_Q, y_Q)$ of a straight line passing through rational points $(p^2(p^3S), (3\chi+1)p^3S)$ by causing the CPU of the electronic computer to function as a third computation unit; and a fourth computation step which computes $f'_{\chi,}{}^S(Q)$ using said $F_{3\chi,ZS}(Z_Q)$ and said values $l_5, l_6, l_7, l_8$ as

[F12]

$$f'_{\chi,}{}^S(Q) = F_{3\chi,ZS}(Z_Q)\{l_5 \cdot l_6\}^{p^3} \cdot l_7 \cdot l_8$$

by causing the CPU of the electronic computer to function as a fourth computation unit; and a fifth computation step which computes the pairing e(S,Q) using said $f'_{\chi,}{}^S(Q)$ as

[F13]

$$e(S,Q) = f'_{\chi,}{}^S(Q)^{(p^3-1)/r}$$

by causing the CPU of the electronic computer to function as a fifth computation unit.

12. A non-transitory computer recording medium storing a pairing compututation program, wherein an elliptic curve is given as $y^2=x^2+ax$, $a\in F_p$, letting an embedding degree be 8, E be an additive group constituted of rational points on the pairing enabled elliptic curve defined over an extension field $F_p{}^8$, E[r] be a set of rational points having a prime order r, and $\phi_p$ be a Frobenius endomorphism, a pairing e is defined using $$G_1 = E[r] \cap \text{Ker}(\phi_p - [1]),$$

$$G_2 = E[r] \cap \text{Ker}(\phi_p - [p]),$$

as a non-degenerate bilinear map $$e: G_1 \times G_2 \rightarrow F^*_p{}^8/(F^*_p{}^8)^r,$$

the pairing computation program causes an electronic computer which includes a CPU to compute the pairing e(S,Q), by letting $S \in G_1$, $Q \in G_2$, $\chi$ be a given integer variable, $Z_S$ be a set of rational points S and $p^3S$, $Z_Q$ be a set of rational points $p^3Q$ and Q, and $F_{3\chi,ZS}(Z_Q)$ be a rational function which is calculated using Miller's algorithm with respect to multi-pairing (MMA), the order r and a trace t of the Frobenius endomorphism $\phi_p$ being specified using the integer variable $\chi$ as, $$r(\chi)=9\chi^4+12\chi^3+8\chi^2+4\chi+1,$$

$$t(\chi)=-9\chi^3-3\chi^2-2\chi,$$

and a representation of the integer variable $\chi$ using $p^2$ and $p^3$ with p as a characteristic being $$p^3 \equiv p^2+3\chi+1 (\bmod r(\chi))$$

the pairing computation program causing the CPU of the electronic computer to function as:
- an input unit which inputs the integer variable $\chi$, the rational point S, and the rational point Q into respective predetermined registers;
- a first computation unit which computes $F_{3\chi,zS}(Z_Q)$;
- a second computation unit which computes respective rational points $p^2(S)$, $p^2(p^3S)$, $(3_\chi+1)S$, $(3_\chi+1)p^2S$ in order using previously obtained results;
- a third computation unit which respectively computes a value $l_5$ at a rational point $Q(x_Q, y_Q)$ of a straight line passing through rational points $(3_\chi S, S)$, a value $l_6$ at the rational point $Q(x_Q, y_Q)$ of a straight line passing through rational points $(p^2(S), (3\chi+1)S)$, a value $l_7$ at the rational point $Q(x_Q, y_Q)$ of a straight line passing through rational points $(3_{\chi p}{}^3S, p^3S)$, and a value $l_8$ at the rational point $Q(x_Q, y_Q)$ of a straight line passing through rational points $(p^2(p^3S), (3_\chi+1)p^3S)$; and
- a fourth computation unit which computes $f'^s_{\chi,}(Q)$ using said $F_{3\chi,zS}(Z_Q)$ and said values $l_5, l_6, l_7, l_8$ as

[F14]

$$f'^s_{\chi,}(Q)=F_{3\chi,zS}(Z_Q)\{l_5 \cdot l_6\}^{p^3} \cdot l_7 \cdot l_8; \text{ and}$$

- a fifth computation unit which computes the pairing e(S,Q) using said $f'^s_{\chi,}(Q)$ as

[F15]

$$e(S,Q) = f'^s_{\chi,}(Q)^{(p^3-1)/r}.$$

13. A pairing computation device, wherein an elliptic curve is given as $y^2 = x^3 + ax + b$, $a \in F_p$, $b \in F_p$, letting k be an embedding degree, E be an additive group constituted of rational points on the pairing enabled elliptic curve defined over an extension field $F_p{}^k$, E[r] be a set of rational points having a prime order r, and $\phi_p$ be a Frobenius endomorphism, a pairing e is defined using $$G_1 = E[r] \cap \text{Ker}(\phi_p - [1]),$$

$$G_2 = E[r] \cap \text{Ker}(\phi_p - [p]),$$

as a non-degenerate bilinear map $$e: G_1 \times G_2 \to F^*_p{}^k / (F^*_p{}^k)^r,$$

the pairing computation device comprising a CPU which computes the pairing e(S,Q), by letting $S \in G_1$, $Q \in G_2$, $\chi$ be a given integer variable, and f be a rational function which is calculated using Miller's algorithm, wherein
the order r and a trace t of the Frobenius endomorphism $\phi_p$ are specified preliminarily according to the embedding degree k using the integer variable $\chi$, and
the CPU includes:
- an input unit which inputs the integer variable $\chi$, the rational point S, and the rational point Q into respective predetermined registers;
- a computation unit which computes f;
- a computation unit which computes a value of a straight line passing through given rational points at a rational point $Q(x_Q, y_Q)$;
- a computation unit which computes $f'^s_{\chi,}(Q)$ using said f and said value; and
- a computation unit which computes the pairing e(S,Q) using said $f'^s_{\chi,}(Q)$ as

[F16]

$$e(S,Q) = f'^s_{\chi,}(Q)^{(p^k-1)/r}.$$

14. A pairing computation method, wherein an elliptic curve is given as $y^2 = x^3 + ax + b$, $a \in F_p$, $b \in F_p$, letting k be an embedding degree, E be an additive group constituted of rational points on the pairing enabled elliptic curve defined over an extension field $F_p{}^k$, E[r] be a set of rational points having a prime order r, and $\phi_p$ be a Frobenius endomorphism, a pairing e is defined using $$G_1 = E[r] \cap \text{Ker}(\phi_p - [1]),$$

$$G_2 = E[r] \cap \text{Ker}(\phi_p - [p]),$$

as non-degenerate bilinear map $$e: G_1 \times G_2 \to F^*_p{}^k / (F^*_p{}^k)^r,$$

an electronic computer which includes a CPU computes the pairing e(S,Q), by letting $S \in G_1$, $Q \in G_2$, $\chi$ be a given integer variable, and f be a rational function which is calculated using Miller's algorithm,
the order r and a trace t of the Frobenius endomorphism $\phi_p$ being specified preliminarily according to the embedding degree k using the integer variable $\chi$,
the pairing computation method comprising:
- a step of inputting the integer variable $\chi$, the rational point S, and the rational point Q into respective predetermined registers by causing the CPU of the electronic computer to function as an input unit;
- a step of computing f by causing the CPU of the electronic computer to function as a computation unit;
- a step of computing a value of a straight line passing through given rational points at a rational point $Q(x_Q, y_Q)$ by causing the CPU of the electronic computer to function as a computation unit;
- a step of computing $f'^s_{\chi,}(Q)$ using said f and said value by causing the CPU of the electronic computer to function as a computation unit; and
- a step of computing the pairing e(S,Q) using said $f'^s_{\chi,}(Q)$ as

[F17]

$$e(S,Q) = f'^s_{\chi,}(Q)^{(p^k-1)/r}$$

by causing the CPU of the electronic computer to function as a computation unit.

15. A non-transitory computer recording medium storing a pairing computation program, wherein an elliptic curve is given as $y^2 = x^3 + ax + b$, $a \in F_p$, $b \in F_p$, letting k be an embedding degree, E be an additive group constituted of rational points on the pairing enabled elliptic curve defined over an extension field $F_p{}^k$, E[r] be a set of rational points having a prime order r, and $\phi_p$ be a Frobenius endomorphism, a pairing e is defined using $$G_1 = E[r] \cap \text{Ker}(\phi_p - [1]),$$

$$G_2 = E[r] \cap \text{Ker}(\phi_p - [p]),$$

as non-degenerate bilinear map $$e: G_1 \times G_2 \to F^*_p{}^k / (F^*_p{}^k)^r,$$

the pairing computation program causes an electronic computer which includes a CPU to compute the pairing e(S,Q), by letting $S \in G_1$, $Q \in G_2$, $\chi$ be a given integer variable, and f be a rational function which is calculated using Miller's algorithm,
the order r and a trace t of the Frobenius endomorphism $\phi_p$ being specified preliminarily according to the embedding degree k using the integer variable $\chi$,
the pairing computation program causing the CPU of the electronic computer to function as:
- an input unit which inputs the integer variable $\chi$, the rational point S, and the rational point Q into respective predetermined registers;
- a computation unit which computes f;

a computation unit which computes a value of a straight line passing through given rational points at a rational point $Q(x_Q, y_Q)$;

a computation unit which computes $f'_{\chi,S}(Q)$ using said f and said value; and a computation unit which computes the pairing $e(S,Q)$ using said $f'_{\chi,S}(Q)$ as

[F18]

$$e(S,Q) = f'_{\chi,S}(Q)^{p^k-1)/r}.$$

16. A pairing computation device, wherein an elliptic curve is given as $y^2 = x^3 + b$, $b \in F_p$, letting an embedding degree be 12, E be an additive group constituted of rational points on the pairing enabled elliptic curve defined over an extension field $F_p^{12}$, $E[r]$ be a set of rational points having a prime order r, and $\phi_p$ be a Frobenius endomorphism, a pairing e is defined using $$G_1 = E[r] \cap \text{Ker}(\phi_p - [1]),$$

$$G_2 = E[r] \cap \text{Ker}(\phi_p - [p]),$$

as a non-degenerate bilinear map $$e: G_1 \times G_2 \to F_p^{*12}/(F_p^{*12})^r,$$

the pairing computation device comprising a CPU which computes the pairing $e(S,Q)$, by letting $S \in G_1$, $Q \in G_2$, $\chi$ be a given integer variable, $f_{2\chi,S}(Q)$ be a rational function which is calculated using Miller's algorithm, wherein the order r and a trace t of the Frobenius endomorphism $\phi_p$ are specified using the integer variable $\chi$ as, $$r(\chi) = 36\chi^4 - 36\chi^3 + 18\chi^2 - 6\chi + 1,$$

$$t(\chi) = 6\chi^2 + 1,$$

and a representation of the integer variable $\chi$ using $p^{10}$ with p as a characteristic is $$p \equiv (2\chi - 1)p^{10} + 2\chi(\text{mod} r(\chi)) \text{ and}$$

the CPU includes:
- an input unit which inputs the integer variable $\chi$, the rational point S, and the rational point Q into respective predetermined registers;
- a first computation unit which computes $f_{2\chi,S}(Q)$ and $f_{2\chi,pS}(Q)$;
- a second computation unit which computes given rational points using $2_\chi S$ and $2_\chi pS$ which are calculated when computing said $f_{2\chi,S}(Q)$ and $f_{2\chi,pS}(Q)$;
- a third computation unit which computes a value at a rational point $Q(x_Q, y_Q)$ of a straight line passing through the given rational points;
- a fourth computation unit which computes $f'_{\chi,S}(Q)$ using said $f_{2\chi,S}(Q)$ and said value; and
- a fifth computation unit which computes the pairing $e(S,Q)$ using said $f'_{\chi,S}(Q)$ as

[F19]

$$e(S,Q) = f'_{\chi,S}(Q)^{(p^{12}-1)/r}.$$

17. The pairing computation device according to claim 16, wherein the second computation unit computes respective rational points $-S$, $(2_\chi-)S$, $p^{10}((2_\chi-1)S)$, $-pS$, $(2_\chi-1)pS$, $p^{10}((2_\chi-1)pS)$ in order using previously obtained results, the third computation unit respectively computes a value $l_1$ at a rational point Q $(x_Q, y_Q)$ on a straight line passing through rational points $((2_\chi-1)S, -S)$, a value $l_2$ at the rational point Q $(x_Q, y_Q)$ of a straight line passing through rational points $(p^{10}((2_\chi-1)S), 2_\chi S)$, a value $l_3$ at the rational point Q $(x_Q, y_Q)$ of a straight line passing through rational points $((2_\chi-1)pS, -pS)$, and a value $l_4$ at the rational point $Q(x_Q, y_Q)$ of a straight line passing through rational points $(p^{10}((2_\chi-1)pS), 2_\chi pS)$, and the fourth computation unit computes $f'_{\chi,S}(Q)$ using the values of the rational point Q $(x_Q, y_Q)$ $l_1, l_2, l_3, l_4$ as

[F20]

$$f'_{\chi,S}(Q) = (\{f_{2\chi,S}(Q) \cdot l_1^{-1}\}^{p^{10}} \cdot f_{2\chi,S}(Q) \cdot l_2)^p \cdot \{f_{2\chi,pS}(Q) \cdot l_3^{-1}\}^{p^{10}} \cdot f_{2\chi,pS}(Q) \cdot l_4.$$

18. A pairing computation method, wherein an elliptic curve is given as $y^2 = x^3 + b$, $b \in F_p$, letting an embedding degree be 12, E be an additive group constituted of rational points on the pairing enabled elliptic curve defined over an extension field $F_p^{12}$, $E[r]$ be a set of rational points having a prime order r, and $\phi_p$ be a Frobenius endomorphism, a pairing e is defined using $$G_1 = E[r] \cap \text{Ker}(\phi_p - [1]),$$

$$G_2 = E[r] \cap \text{Ker}(\phi_p - [p]),$$

as a non-degenerate bilinear map $$e: G_1 \times G_2 \to F_p^{*12}/(F_p^{*12})^r,$$

an electronic computer which includes a CPU computes the pairing $e(S,Q)$, by letting $S \in G_1$, $Q \in G_2$, $\chi$ be a given integer variable, and $f_{2\chi,S}(Q)$ be a rational function which is calculated using Miller's algorithm, the order r and a trace t of the Frobenius endomorphism $\phi_p$ being specified using the integer variable $\chi$ as, $$r(\chi) = 36\chi^4 - 36\chi^3 + 18\chi^2 - 6\chi + 1,$$

$$t(\chi) = 6\chi^2 + 1,$$

and a representation of the integer variable $\chi$ using $p^{10}$ with p as a characteristic being $$p \equiv (2\chi - 1)p^{10} + 2\chi(\text{mod} r(\chi)),$$

the pairing computation method comprising:
- an input step which inputs the integer variable $\chi$, the rational point S, and the rational point Q into respective predetermined registers by causing the CPU of the electronic computer to function as an input unit;
- a first computation step which computes $f_{2\chi,S}(Q)$ and $f_{2\chi,pS}(Q)$ by causing the CPU of the electronic computer to function as a first computation unit;
- a second computation step which computes given rational points using $2_\chi S$ and $2_\chi pS$ which are calculated when computing said $f_{2\chi,S}(Q)$ and $f_{2\chi,pS}(Q)$ by causing the CPU of the electronic computer to function as a second computation unit;
- a third computation step which computes a value at a rational point $Q(x_Q, y_Q)$ of a straight line passing through the given rational points by causing the CPU of the electronic computer to function as a third computation unit;
- a fourth computation step which computes $f'_{\chi,S}(Q)$ using said $f_{2\chi,S}(Q)$ and said value by causing the CPU of the electronic computer to function as a fourth computation unit; and
- a fifth computation step which computes the pairing $e(S,Q)$ using said $f'_{\chi,S}(Q)$ as

[F21]

$$e(S,Q) = f'_{\chi,S}(Q)^{(p^{12}-1)/r}.$$

by causing the CPU of the electronic computer to function as a fifth computation unit.

19. The pairing computation method according to claim 18, wherein the second computation step computes respective rational points $-S$, $(2_\chi-1)S$, $p^{10}((2_\chi-1)S)$, $-pS$, $(2_\chi-1)pS$, $p^{10}((2_\chi-1)pS)$ in order using previously obtained results, the third computation step respectively computes a value $l_1$ at a rational point $Q(x_Q, y_Q)$ of a straight line passing through rational points $((2_\chi-1)S, -S)$, a value $l_2$ at the rational point $Q(x_Q, y_Q)$ of a straight line passing through rational points $(p^{10}((2_\chi-1)S), 2_\chi S)$, a value $l_3$ at the rational point $Q(x_Q, y_Q)$ of a straight line passing through rational points $((2_\chi-1)pS, -pS)$, and a value $l_4$ at the rational point $Q(x_Q, y_Q)$ of a straight line passing through rational points $(p^{10}((2_\chi-1)pS), 2_\chi pS)$, and the fourth computation step computes $f_{\chi,}{}^s(Q)$ using the values of the rational point $Q(x_Q, y_Q)$ $l_1, l_2, l_3, l_4$ as

[F22]

$$f_{\chi,}{}^S(Q) = (\{f_{2\chi,}{}^S(Q) \cdot l_1{}^{-1}\}^{p^{10}} \cdot f_{2\chi,}{}^S(Q) \cdot l_2)^p \cdot \{f_{2\chi,pS}(Q) \cdot l_3{}^{-1}\}^p \cdot f_{2\chi,pS}(Q) \cdot l_4.$$

20. A non-transitory computer recording medium storing a pairing computation program, wherein an elliptic curve is given as $y^2 = x^3 + b$, $b \in F_p$, letting an embedding degree be 12, E be an additive group constituted of rational points on the pairing enabled elliptic curve defined over an extension field $F_p{}^{12}$, E[r] be a set of rational points having a prime order r, and $\phi_p$ be a Frobenius endomorphism, a pairing e is defined using $$G_1 = E[r] \cap \mathrm{Ker}(\phi_p - [1]),$$

$$G_2 = E[r] \cap \mathrm{Ker}(\phi_p - [p]),$$

as a non-degenerate bilinear map $$e: G_1 \times G_2 \to F^*_p{}^{12}/(F^*_p{}^{12})^r,$$

the pairing computation program causes an electronic computer which includes a CPU to compute the pairing $e(S,Q)$, by letting $S \in G_1$, $Q \in G_2$, $\chi$ be a given integer variable, and $f_{2\chi,}{}^s(Q)$ and $f_{2\chi,pS}(Q)$ be a rational function which is calculated using Miller's algorithm, the order r and a trace t of the Frobenius endomorphism $\phi_p$ being specified using the integer variable $\chi$ as, $$r(\chi) = 36_\chi{}^4 - 36_\chi{}^3 + 18_\chi{}^2 - 6_\chi + 1,$$

$$t(\chi) = 6_\chi{}^2 + 1,$$

and a representation of the integer variable $\chi$ using $p^{10}$ with p as a characteristic being $$p \equiv (2_\chi - 1)p^{10} + 2_\chi (\mathrm{mod} \, r(\chi)),$$

the pairing computation program causing the CPU of the electronic computer to function as:

an input unit which inputs the integer variable $\chi$, the rational point S, and the rational point Q into respective predetermined registers;

a first computation unit which computes $f_{2\chi,}{}^s(Q)$ and $f_{2\chi,pS}(Q)$;

a second computation unit which computes given rational points using $2_\chi S$ and $2_\chi pS$ which are calculated when computing said $f_{2\chi,}{}^s(Q)$ and $f_{2\chi,pS}(Q)$;

a third computation unit which computes a value at a rational point $Q(x_Q, y_Q)$ of a straight line passing through the given rational points;

a fourth computation unit which computes $f_{\chi,}{}^s(Q)$ using said $f_{2\chi,}{}^s(Q)$ and said value; and a fifth computation unit which computes the pairing $e(S,Q)$ using said $f_{\chi,}{}^s(Q)$ as

[F23]

$$e(S,Q) = f_{\chi,}{}^S(Q)^{(p^{12}-1)/r}.$$

21. The non-transitory computer recording medium storing a pairing computation program according to claim 20, wherein The pairing computation program causes:

the CPU of the electronic computer which functions as the second computation unit to compute respective rational points $-S$, $(2_\chi-1)S$, $p^{10}((2_\chi-1)S)$, $-pS$, $(2_\chi-1)pS$, $p^{10}((2_\chi-1)pS)$ in order using previously obtained results;

the CPU of the electronic computer which functions as the third computation unit to respectively compute a value $l_1$ at a rational point $Q(x_Q, y_Q)$ of a straight line passing through rational points $((2_\chi-1)S, -S)$, a value $l_2$ at the rational point $Q(x_Q, y_Q)$ of a straight line passing through rational points $(p^{10}((2_\chi-1)S), 2_\chi S)$, a value $l_3$ at the rational point $Q(x_Q, y_Q)$ of a straight line passing through rational points $((2_\chi-1)pS, -pS)$, and a value $l_4$ at the rational point $Q(x_Q, y_Q)$ of a straight line passing through rational points $(p^{10}((2_\chi-1)pS), 2_\chi pS)$; and the CPU of the electronic computer which functions as the fourth computation unit to compute $f_{\chi,}{}^s(Q)$ using the values of the rational point $Q(x_Q, y_Q)$ $l_1, l_2, l_3, l_4$ as

[F24]

$$f_{\chi,}{}^S(Q) = (\{f_{2\chi,}{}^S(Q) \cdot l_1{}^{-1}\}^{p^{10}} \cdot f_{2\chi,}{}^S(Q) \cdot l_2)^p \cdot \{f_{2\chi,pS}(Q) \cdot l_3{}^{-1}\}^p \cdot f_{2\chi,pS}(Q) \cdot l_4.$$

22. A pairing computation device, wherein an elliptic curve is given as $y^2 = x^3 + ax$, $a \in F_p$, letting an embedding degree be 8, E be an additive group constituted of rational points on the pairing enabled elliptic curve defined over an extension field $F_p{}^8$, E[r] be a set of rational points having a prime order r, and $\phi_p$ be a Frobenius endomorphism, a pairing e is defined using $$G_1 = E[r] \chi \mathrm{Ker}(\phi_p - [1]),$$

$$G_2 = E[r] \chi \mathrm{Ker}(\phi_p - [p]),$$

as a non-degenerate bilinear map $$e: G_1 \times G_2 \to F^*_p{}^8/(F^*_p{}^8)^r,$$

the pairing computation device comprising a CPU which computes the pairing $e(S,Q)$, by letting $S \in G_1$, $Q \in G_2$, $\chi$ be a given integer variable, and $f_{3\chi,}{}^s(Q)$ be a rational function which is calculated using Miller's algorithm, wherein the order r and a trace t of the Frobenius endomorphism $\phi_p$ are specified using the integer variable $\chi$ as, $$r(\chi) = 9_\chi{}^4 + 12_\chi{}^3 + 8_\chi{}^2 + 4_\chi + 1,$$

$$t(\chi) = -9_\chi{}^3 - 3_\chi{}^2 - 2_\chi,$$

and a representation of the integer variable $\chi$ using $p^2$ and $p^3$ with p as a characteristic is $$p^3 \equiv p^2 + 3_\chi + 1 (\mathrm{mod} \, r(\chi)) \text{ and}$$

the CPU includes:

an input unit which inputs the integer variable $\chi$, the rational point S, and the rational point Q into respective predetermined registers;

a first computation unit which computes $f_{3\chi,}{}^s(Q)$ and $f_{3\chi,p^3 S}(Q)$;

a second computation unit which computes respective rational points $p^2(S)$, $(3_\chi+1)S$, $p^2(p^3 S)$, $(3_\chi+1)p^3 S$ in order using previously obtained results;

a third computation unit respectively computes a value $l_5$ at a rational point $Q(x_Q, y_Q)$ of a straight line passing through rational points $(3_\chi S, S)$, a value $l_6$ at the rational point $Q(x_Q, y_Q)$ of a straight line passing through rational points $(p^2(S), (3_\chi+1)S)$, a value $l_7$ at the rational point $Q(x_Q, y_Q)$ of a straight line passing through rational points $(3_\chi p^3 S, p^3 S)$, and a value $l_8$ at the rational point Q($x_Q$, $y_Q$) of a straight line passing through rational points ($p^2(p^3S)$, $(3_\chi+1)p^3S$); and the fourth computation unit which computes $f'_{\chi,}{}^S(Q)$ using the computation result of the first computation unit and the computation result of the third computation unit as

[F25]

$$f'_{\chi,}{}^S(Q)=(f_{3\chi,}{}^S(Q)\cdot l_5\cdot l_6)^{p^3}f_{3\chi,p^3S}(Q)\cdot l_7\cdot l_8; \text{ and}$$

a fifth computation unit which computes the pairing e(S,Q) using said $f'_{\chi,}{}^S(Q)$ as

[F26]

$$e(S,Q)=f'_{\chi,}{}^S(Q)^{(p^3-1)/r}.$$

23. A pairing computation method, wherein an elliptic curve is given as $y^2=x^3+ax$, $a \in F_p$, letting an embedding degree be 8, E be an additive group constituted of rational points on the pairing enabled elliptic curve defined over an extension field $F_p^8$, E[r] be a set of rational points having a prime order r, and $\phi_p$ be a Frobenius endomorphism, a pairing e is defined using $$G_1=E[r] \cap \text{Ker}(\phi_p-[1]),$$

$$G_2=E[r] \cap \text{Ker}(\phi_p-[p]),$$

as a non-degenerate bilinear map $$e: G_1 \times G_2 \to F^*_p{}^8/(F^*_p{}^8)^r,$$

an electronic computer which includes a CPU computes the pairing e(S,Q), by letting $S \in G_1$, $Q \in G_2$, $\chi$ be a given integer variable, and $f_{3\chi,}{}^S(Q)$ be a rational function which is calculated using Miller's algorithm, the order r and a trace t of the Frobenius endomorphism $\phi_p$ being specified using the integer variable $\chi$ as, $$r(\chi)=9\chi^4+12\chi^3+8\chi^2+4\chi+1,$$

$$t(\chi)=-9\chi^3-3\chi^2-2\chi,$$

and a representation of the integer variable $\chi$ using $p^2$ and $p^3$ with p as a characteristic being $$p^3 \equiv p^2+3\chi+1 (\text{mod} r(\chi))$$

the pairing computation method comprising:
an input step which inputs the integer variable $\chi$, the rational point S, and the rational point Q into respective predetermined registers by causing the CPU of the electronic computer to function as an input unit;
a first computation step which computes $f_{3\chi,}{}^S(Q)$ and $f_{3\chi,p^{-3}S}(Q)$ by causing the CPU of the electronic computer to function as a first computation unit;
a second computation step which computes respective rational points $p^2(S)$, $(3_\chi+1)S$, $p^2(p^3S)$, $(3_\chi+1)p^3S$ in order using previously obtained results by causing the CPU of the electronic computer to function as a second computation unit;
a third computation step which respectively computes a value $l_5$ at a rational point Q($x_Q$, $y_Q$) of a straight line passing through rational points $(3_\chi S, S)$, a value $l_6$ at the rational point Q($x_Q$, $y_Q$) of a straight line passing through rational points $(p^2(S), (3_\chi+1)S)$, a value $l_7$ at the rational point Q($x_Q$, $y_Q$) of a straight line passing through rational points $(3_\chi p^3S, p^3S)$, and a value $l_8$ at the rational point Q($x_Q$, $y_Q$) of a straight line passing through rational points ($p^2(p^3S)$, $(3_\chi+1)p^3S$) by causing the CPU of the electronic computer to function as a third computation unit; and
a fourth computation step which computes $f'_{\chi,}{}^S(Q)$ using said $f_{3\chi,}{}^S(Q)$ and said $f_{3\chi,p^{-3}S}(Q)$ and said values $l_5$, $l_6$, $l_7$, $l_8$ as

[F27]

$$f'_{\chi,}{}^S(Q)=(f_{3\chi,}{}^S(Q)\cdot l_5\cdot l_6)^{p^3}f_{3\chi,p^3S}(Q)\cdot l_7\cdot l_8;$$

by causing the CPU of the electronic computer to function as a fourth computation unit; and
a fifth computation step which computes the pairing e(S,Q) using said $f'_{\chi,}{}^S(Q)$ as

[F28]

$$e(S,Q)=f'_{\chi,}{}^S(Q)^{(p^3-1)/r}$$

by causing the CPU of the electronic computer to function as a fifth computation unit.

24. A non-transitory computer recording medium storing a pairing computation program, wherein an elliptic curve is given as $y^2=x^3+ax$, $a \in F_p$, letting an embedding degree be 8, E be an additive group constituted of rational points on the pairing enabled elliptic curve defined over an extension field $F_p^8$, E[r] be a set of rational points having a prime order r, and $\phi_p$ be a Frobenius endomorphism, a pairing e is defined using $$G_1=E[r] \cap \text{Ker}(\phi_p-[1]),$$

$$G_2=E[r] \cap \text{Ker}(\phi_p-[p]),$$

as a non-degenerate bilinear map $$e: G_1 \times G_2 \to F^*_p{}^8/(F^*_p{}^8)^r,$$

the pairing computation program causes an electronic computer which includes a CPU to compute the pairing e(S,Q), by letting $S \in G_1$, $Q \in G_2$, $\chi$ be a given integer variable, and $f_{3\chi,}{}^S(Q)$ be a rational function which is calculated using Miller's algorithm, the order r and a trace t of the Frobenius endomorphism $\phi_p$ being specified using the integer variable $\chi$ as, $$r(\chi)=9\chi^4+12\chi^3+8\chi^2+4\chi+1,$$

$$t(\chi)=-9\chi^3-3\chi^2-2\chi,$$

and a representation of the integer variable $\chi$ using $p^2$ and $p^3$ with p as a characteristic being $$p^3 \equiv p^2+3\chi+1 (\text{mod} r(\chi))$$

the pairing computation program causing the CPU of the electronic computer to function as:
an input unit which inputs the integer variable $\chi$, the rational point S, and the rational point Q into respective predetermined registers;
a first computation unit which computes $f_{3\chi,}{}^S(Q)$ and $f_{3\chi,p^{-3}S}(Q)$;
a second computation unit which computes respective rational points $p^2(S)$, $(3_\chi+1)S$, $p^2(p^3S)$, $(3_\chi+1)p^3S$ in order using previously obtained results;
a third computation unit which respectively computes a value $l_5$ at a rational point Q ($x_Q$, $y_Q$) of a straight line passing through rational points $(3_\chi S, S)$, a value $l_6$ at the rational point Q ($x_Q$, $y_Q$) of a straight line passing through rational points $(p^2(S), (3_\chi+1)S)$, a value $l_7$ at the rational point Q ($x_Q$, $y_Q$) of a straight line passing through rational points $(3_{\chi p}{}^3S, p^3S)$, and a value $l_8$ at the rational point Q ($x_Q$, $y_Q$) of a straight line passing through rational points ($p^2(p^2S)$, $(3_\chi+1)p^3S$); and
a fourth computation unit which computes $f'_{\chi,}{}^S(Q)$ using said $f_{3\chi,}{}^S(Q)$ and said $f_{3\chi,p^{-3}S}(Q)$ and said values $l_5$, $l_6$, $l_7$, $l_8$ as

[F29]

$$f'_{\chi,}{}^S(Q)=(f_{3\chi,}{}^S(Q)\cdot l_5\cdot l_6)^{p^3}f_{3\chi,p^3S}(Q)\cdot l_7\cdot l_8; \text{ and}$$

a fifth computation unit which computes the pairing e(S,Q) using said $f'_{\chi,}{}^S(Q)$ as

[F30]

$$e(S,Q)=f'_{\chi,}{}^S(Q)^{(p^3-1)/r}.$$

* * * * *